US012425938B2

United States Patent
Shehata et al.

(10) Patent No.: US 12,425,938 B2
(45) Date of Patent: Sep. 23, 2025

(54) TECHNIQUES FOR LAYER 2 SIGNALING FOR LAYER 1 AND LAYER 2 MOBILITY

(71) Applicant: QUALCOMM Incorporated, San Diego, CA (US)

(72) Inventors: Mohamed Atef Abdelazim Shehata, Lannion (FR); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/863,044

(22) Filed: Jul. 12, 2022

(65) Prior Publication Data

US 2024/0022982 A1    Jan. 18, 2024

(51) Int. Cl.
*H04W 36/04* (2009.01)
*H04W 36/00* (2009.01)
*H04W 36/08* (2009.01)

(52) U.S. Cl.
CPC ....... *H04W 36/04* (2013.01); *H04W 36/0058* (2018.08); *H04W 36/08* (2013.01)

(58) Field of Classification Search
CPC . H04W 36/04; H04W 36/0058; H04W 36/08; H04W 36/0069; H04W 36/0061; H04L 5/0023; H04L 5/0098
See application file for complete search history.

(56) References Cited

U.S. PATENT DOCUMENTS

| | | | |
|---|---|---|---|
| 2019/0208436 A1* | 7/2019 | Zhou | H04L 1/0009 |
| 2021/0385702 A1 | 12/2021 | Damnjanovic et al. | |
| 2022/0141748 A1 | 5/2022 | Lee et al. | |
| 2022/0225369 A1 | 7/2022 | Park et al. | |
| 2023/0007499 A1* | 1/2023 | Da Silva | H04W 24/02 |
| 2024/0334263 A1* | 10/2024 | Zhang | H04W 36/0055 |

FOREIGN PATENT DOCUMENTS

| | | |
|---|---|---|
| WO | WO-2020164177 A1 | 8/2020 |
| WO | WO-2021066700 A1 | 4/2021 |

OTHER PUBLICATIONS

3GPP TS 38.321 version 17.0.0 Release 17 (May 2022) (Year: 2022).*

(Continued)

*Primary Examiner* — Charles C Jiang
*Assistant Examiner* — Margaret Marie Anderson
(74) *Attorney, Agent, or Firm* — Holland & Hart LLP

(57) ABSTRACT

Methods, systems, and devices for wireless communications are described. A user equipment (UE) may be configured to receive, from a first serving cell, Layer 3 (L3) control signaling indicative of multiple sets of parameters for primary serving cell and secondary serving cell operation. The UE may receive, from the first serving cell, via Layer 2 (L2) control signaling indicating an activation of a second serving cell at the UE and an indication that specifies that the second serving cell is to be activated as a primary serving cell. The UE may then communicate with the second serving cell as the primary serving cell based on receiving the second signaling and in accordance with a set of parameters from the multiple sets of parameters indicated by the L3 control signaling.

30 Claims, 20 Drawing Sheets

(56) References Cited

OTHER PUBLICATIONS

3GPP TS 38.321: "3rd Generation Partnership Project, Technical Specification Group Radio Access Network, NR, Medium Access Control (MAC) Protocol Specification (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.0.0 (Mar. 2022), Apr. 14, 2022, pp. 1-221, XP052145972, paragraph [5.15.1], pp. 84, 199-200.
International Search Report and Written Opinion—PCT/US2023/023397—ISA/EPO—Aug. 18, 2023.

* cited by examiner

TECHNIQUES FOR LAYER 2 SIGNALING FOR LAYER 1 AND LAYER 2 MOBILITY

FIELD OF TECHNOLOGY

The following relates to wireless communications, including techniques for Layer 2 (L2) signaling for Layer 1 (L1) and L2 mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may be connected to multiple serving cells at a time. For example, a UE may be connected to a primary cell (PCell) and a secondary cell (SCell). As the UE moves within a wireless communications system, the UE may move in and out of coverage areas associated with different serving cells, and may therefore perform handover procedures from one PCell to another.

SUMMARY

The described techniques relate to improved methods, systems, devices, and apparatuses that support techniques for Layer 2 (L2) signaling for Layer 1 (L1) and L2 mobility. Generally, aspects of the present disclosure support techniques for performing handover procedures for primary cells (PCells) using Layer 2 (L2) signaling. In particular, aspects of the present disclosure are directed to medium access control-control element (MAC-CE) message structures that enable the MAC-CE messages to activate and deactivate PCells, secondary cells (SCells), or both, to enable handover procedures to be performed via L2 signaling. For example, a UE may receive an L2 message (e.g., MAC-CE) that includes a bitmap corresponding to multiple serving cells, where values of bit fields within the bitmap (e.g., 0s or 1s) indicate which serving cells are activated and which are deactivated. In this example, the L2 message may also include some indication as to whether each activated serving cell is activated as a PCell or an SCell. For example, the L2 message may include a tracking reference signal (TRS) identifier (TRS ID) octet for each activated serving cell, where each TRS ID includes a bit field that indicates whether the respective serving cell is to be activated as a PCell or an SCell.

A method for wireless communication at a user equipment (UE) is described. The method may include receiving, from a first serving cell and via L3 control signaling, first signaling indicative of a set of multiple sets of parameters for primary serving cell or secondary serving cell operation, receiving, from the first serving cell and via L2 control signaling, second signaling indicating an activation of a second serving cell at the UE, receiving, via the second signaling, an indication that specifies that the second serving cell is to be activated as a primary serving cell, and communicating with the second serving cell as the primary serving cell based on receiving the second signaling and in accordance with a set of parameters from the set of multiple sets of parameters indicated by the first signaling.

An apparatus for wireless communication at a UE is described. The apparatus may include a processor, memory coupled with the processor, and instructions stored in the memory. The instructions may be executable by the processor to cause the apparatus to receive, from a first serving cell and via L3 control signaling, first signaling indicative of a set of multiple sets of parameters for primary serving cell or secondary serving cell operation, receive, from the first serving cell and via L2 control signaling, second signaling indicating an activation of a second serving cell at the UE, receive, via the second signaling, an indication that specifies that the second serving cell is to be activated as a primary serving cell, and communicate with the second serving cell as the primary serving cell based on receiving the second signaling and in accordance with a set of parameters from the set of multiple sets of parameters indicated by the first signaling.

Another apparatus for wireless communication at a UE is described. The apparatus may include means for receiving, from a first serving cell and via L3 control signaling, first signaling indicative of a set of multiple sets of parameters for primary serving cell or secondary serving cell operation, means for receiving, from the first serving cell and via L2 control signaling, second signaling indicating an activation of a second serving cell at the UE, means for receiving, via the second signaling, an indication that specifies that the second serving cell is to be activated as a primary serving cell, and means for communicating with the second serving cell as the primary serving cell based on receiving the second signaling and in accordance with a set of parameters from the set of multiple sets of parameters indicated by the first signaling.

A non-transitory computer-readable medium storing code for wireless communication at a UE is described. The code may include instructions executable by a processor to receive, from a first serving cell and via L3 control signaling, first signaling indicative of a set of multiple sets of parameters for primary serving cell or secondary serving cell operation, receive, from the first serving cell and via L2 control signaling, second signaling indicating an activation of a second serving cell at the UE, receive, via the second signaling, an indication that specifies that the second serving cell is to be activated as a primary serving cell, and communicate with the second serving cell as the primary serving cell based on receiving the second signaling and in accordance with a set of parameters from the set of multiple sets of parameters indicated by the first signaling.

Some examples of the method, apparatuses, and non-transitory computer-readable medium described herein may further include operations, features, means, or instructions for receiving, via the second signaling, a set of bit field values associated with the activation of the second serving cell, where one or more bit field values of the set of bit field values indicate the set of parameters associated with primary serving cell, where communicating with the second serving cell as the primary serving cell may be based on receiving the one or more bit field values.

In some examples of the method, apparatuses, and non-transitory computer-readable medium described herein, the one or more bit field values indicate a TRS ID corresponding to the set of parameters associated with the primary serving cell.

Some examples of the method, apparatuses, and non-transitory computer-readable medium described herein may further include operations, features, means, or instructions for receiving, via the second signaling, a first bit field value of the set of bit field values that includes the indication that specifies that the second serving cell may be to be activated as the primary serving cell, where communicating with the second serving cell as the primary serving cell may be based on receiving the first bit field value.

Some examples of the method, apparatuses, and non-transitory computer-readable medium described herein may further include operations, features, means, or instructions for receiving, via the second signaling based on the second serving cell being activated as the primary serving cell, a second set of bit field values indicating a second set of parameters associated with the primary serving cell, where communicating with the second serving cell as the primary serving cell may be based on the second set of parameters.

In some examples of the method, apparatuses, and non-transitory computer-readable medium described herein, the set of bit field values indicate a TRS ID corresponding to the set of parameters associated with the primary serving cell and the second set of bit field values indicate a special cell configuration corresponding to the second set of parameters associated with the primary serving cell.

In some examples of the method, apparatuses, and non-transitory computer-readable medium described herein, the set of bit field values includes a first octet of bit field values and the second set of bit field values includes a second set of bit field values.

In some examples of the method, apparatuses, and non-transitory computer-readable medium described herein, a first subset of bit field values of the second set of bit field values indicate the second set of parameters associated with the primary serving cell, a second subset of bit field values of the second set of bit field values indicate beam information associated with the primary serving cell, and communicating with the second serving cell as the primary serving cell may be based on the beam information.

Some examples of the method, apparatuses, and non-transitory computer-readable medium described herein may further include operations, features, means, or instructions for receiving, via the second signaling based on the second serving cell being activated as the primary serving cell, a second set of bit field values including at least a first bit field value indicating a cell index associated with the second serving cell that specifies that the second serving cell may be to be activated as the primary serving cell, and at least a second bit field value indicating a second set of parameters associated with the primary serving cell, where communicating with the second serving cell as the primary serving cell may be based on receiving the second set of bit field values.

Some examples of the method, apparatuses, and non-transitory computer-readable medium described herein may further include operations, features, means, or instructions for receiving, via the second signaling based on the second serving cell being activated as the primary serving cell, a second set of bit field values indicating a cell index associated with the second serving cell that specifies that the second serving cell may be to be activated as the primary serving cell and receiving, via the second signaling based on the second serving cell being activated as the primary serving cell, a third set of bit field values indicating a second set of parameters associated with the primary serving cell, where communicating with the second serving cell as the primary serving cell may be based on receiving the second set of bit field values and the third set of bit field values.

Some examples of the method, apparatuses, and non-transitory computer-readable medium described herein may further include operations, features, means, or instructions for receiving, via the second signaling, an activation of a third serving cell at the UE, receiving, via the second signaling, an indication that specifies that the third serving cell may be to be activated as a secondary serving cell, and communicating with the third serving cell as the secondary serving cell based on receiving the second signaling and in accordance with a second set of parameters from the set of multiple sets of parameters indicated by the first signaling.

In some examples of the method, apparatuses, and non-transitory computer-readable medium described herein, the first serving cell includes an additional primary serving cell and the method, apparatuses, and non-transitory computer-readable medium may include further operations, features, means, or instructions for receiving, via the second signaling, a deactivation of the additional primary serving cell and deactivating the additional primary serving cell based on receiving the second signaling, where communicating with the second serving cell as the primary serving cell may be based on deactivating the additional primary serving cell.

Some examples of the method, apparatuses, and non-transitory computer-readable medium described herein may further include operations, features, means, or instructions for receiving, via the second signaling, a bit field value that indicates the second signaling includes a message format that may be associated with an activation, a deactivation, or both, of both primary serving cells and secondary serving cells, where receiving the indication that specifies that the second serving cell may be to be activated as a primary serving cell may be based on the second signaling including the message format.

In some examples of the method, apparatuses, and non-transitory computer-readable medium described herein, the second signaling may be associated with a logical channel identifier (LCID) indicating a message format that may be associated with an activation, a deactivation, or both, of both primary serving cells and secondary serving cells.

In some examples of the method, apparatuses, and non-transitory computer-readable medium described herein, the L3 control signaling includes radio resource control (RRC) signaling and the L2 control signaling includes medium access control-control element (MAC-CE) signaling.

A method for wireless communication at a network entity is described. The method may include transmitting, to a UE using a first serving cell supported by the network entity and via L3 control signaling, first signaling indicative of a set of multiple sets of parameters for primary serving cell or secondary serving cell operation, transmitting, to the UE using the first serving cell and via L2 control signaling, second signaling that activates a second serving cell at the UE, transmitting, via the second signaling, an indication that specifies that the second serving cell is to be activated as a primary serving cell, and deactivating the first serving cell at the UE based on the second serving cell to be activated at the UE as the primary serving cell.

An apparatus for wireless communication at a network entity is described. The apparatus may include a processor, memory coupled with the processor, and instructions stored in the memory. The instructions may be executable by the processor to cause the apparatus to transmit, to a UE using a first serving cell supported by the network entity and via L3 control signaling, first signaling indicative of a set of multiple sets of parameters for primary serving cell or secondary serving cell operation, transmit, to the UE using the first serving cell and via L2 control signaling, second signaling that activates a second serving cell at the UE, transmit, via the second signaling, an indication that specifies that the second serving cell is to be activated as a primary serving cell, and deactivate the first serving cell at the UE based on the second serving cell to be activated at the UE as the primary serving cell.

Another apparatus for wireless communication at a network entity is described. The apparatus may include means for transmitting, to a UE using a first serving cell supported by the network entity and via L3 control signaling, first signaling indicative of a set of multiple sets of parameters for primary serving cell or secondary serving cell operation, means for transmitting, to the UE using the first serving cell and via L2 control signaling, second signaling that activates a second serving cell at the UE, means for transmitting, via the second signaling, an indication that specifies that the second serving cell is to be activated as a primary serving cell, and means for deactivating the first serving cell at the UE based on the second serving cell to be activated at the UE as the primary serving cell.

A non-transitory computer-readable medium storing code for wireless communication at a network entity is described. The code may include instructions executable by a processor to transmit, to a UE using a first serving cell supported by the network entity and via L3 control signaling, first signaling indicative of a set of multiple sets of parameters for primary serving cell or secondary serving cell operation, transmit, to the UE using the first serving cell and via L2 control signaling, second signaling that activates a second serving cell at the UE, transmit, via the second signaling, an indication that specifies that the second serving cell is to be activated as a primary serving cell, and deactivate the first serving cell at the UE based on the second serving cell to be activated at the UE as the primary serving cell.

Some examples of the method, apparatuses, and non-transitory computer-readable medium described herein may further include operations, features, means, or instructions for transmitting, via the second signaling, a set of bit field values associated with the activation of the second serving cell, where one or more bit field values of the set of bit field values indicate the set of parameters associated with primary serving cell, where deactivating the first serving cell may be based on transmitting the one or more bit field values.

In some examples of the method, apparatuses, and non-transitory computer-readable medium described herein, the one or more bit field values indicate a TRS ID corresponding to the set of parameters associated with the primary serving cell.

Some examples of the method, apparatuses, and non-transitory computer-readable medium described herein may further include operations, features, means, or instructions for transmitting, via the second signaling, a first bit field value of the set of bit field values that includes the indication that specifies that the second serving cell may be to be activated as the primary serving cell, where deactivating the first serving cell may be based on transmitting the first bit field value.

Some examples of the method, apparatuses, and non-transitory computer-readable medium described herein may further include operations, features, means, or instructions for transmitting, via the second signaling based on the second serving cell being activated as the primary serving cell, a second set of bit field values indicating a second set of parameters associated with the primary serving cell.

In some examples of the method, apparatuses, and non-transitory computer-readable medium described herein, the set of bit field values indicate a TRS ID corresponding to the set of parameters associated with the primary serving cell and the second set of bit field values indicate a special cell configuration corresponding to the second set of parameters associated with the primary serving cell.

In some examples of the method, apparatuses, and non-transitory computer-readable medium described herein, the set of bit field values includes a first octet of bit field values and the second set of bit field values includes a second set of bit field values.

In some examples of the method, apparatuses, and non-transitory computer-readable medium described herein, a first subset of bit field values of the second set of bit field values indicate the second set of parameters associated with the primary serving cell and a second subset of bit field values of the second set of bit field values indicate beam information associated with the primary serving cell.

Some examples of the method, apparatuses, and non-transitory computer-readable medium described herein may further include operations, features, means, or instructions for transmitting, via the second signaling based on the second serving cell being activated as the primary serving cell, a second set of bit field values including at least a first bit field value including the indication that specifies that the second serving cell may be to be activated as the primary serving cell, and at least a second bit field value indicating a second set of parameters associated with the primary serving cell.

Some examples of the method, apparatuses, and non-transitory computer-readable medium described herein may further include operations, features, means, or instructions for transmitting, via the second signaling based on the second serving cell being activated as the primary serving cell, a second set of bit field values including the indication that specifies that the second serving cell may be to be activated as the primary serving cell and transmitting, via the second signaling based on the second serving cell being activated as the primary serving cell, a third set of bit field values indicating a second set of parameters associated with the primary serving cell.

Some examples of the method, apparatuses, and non-transitory computer-readable medium described herein may further include operations, features, means, or instructions for transmitting, via the second signaling, an activation of a third serving cell at the UE and transmitting, via the second signaling, an indication that specifies that the third serving cell may be to be activated as a secondary serving cell.

In some examples of the method, apparatuses, and non-transitory computer-readable medium described herein, the first serving cell includes an additional primary serving cell and the method, apparatuses, and non-transitory computer-readable medium may include further operations, features, means, or instructions for transmitting, via the second signaling, a deactivation of the additional primary serving cell, where deactivating the first serving cell may be based on transmitting the second signaling.

Some examples of the method, apparatuses, and non-transitory computer-readable medium described herein may further include operations, features, means, or instructions for transmitting, via the second signaling, a bit field value that indicates the second signaling includes a message format that may be associated with an activation, a deactivation, or both, of both primary serving cells and secondary serving cells, where transmitting the indication that specifies that the second serving cell may be to be activated as a primary serving cell may be based on the second signaling including the message format.

In some examples of the method, apparatuses, and non-transitory computer-readable medium described herein, the second signaling may be associated with a LCID indicating a message format that may be associated with an activation, a deactivation, or both, of both primary serving cells and secondary serving cells.

In some examples of the method, apparatuses, and non-transitory computer-readable medium described herein, the L3 control signaling includes RRC signaling and the L2 control signaling includes MAC-CE signaling.

DETAILED DESCRIPTION

Figure 1:
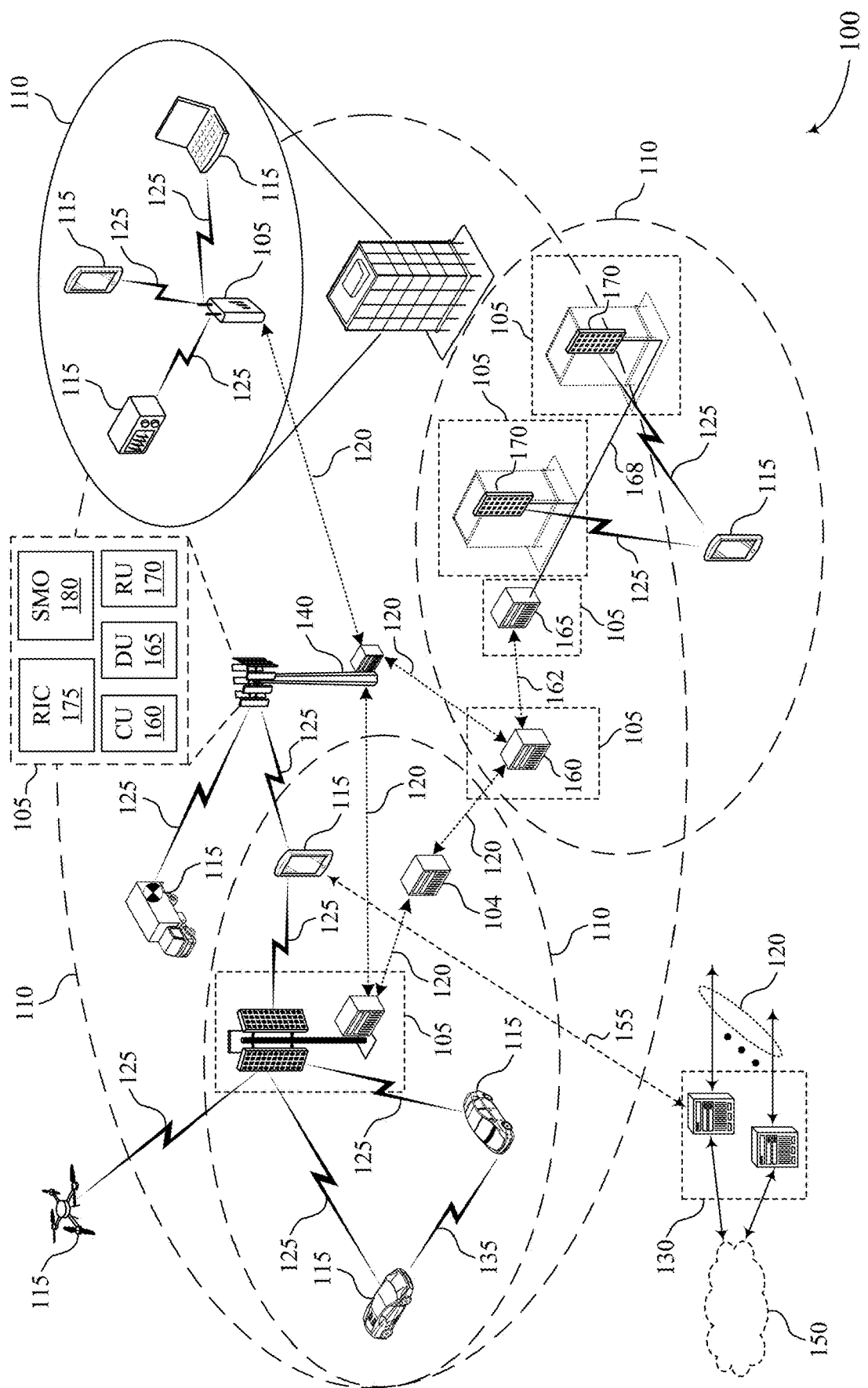
FIG. 1 illustrates an example of a wireless communications system that supports techniques for Layer 2 (L2) signaling for Layer 1 (L1) and L2 mobility in accordance with one or more aspects of the present disclosure.

In some wireless communications systems, a user equipment (UE) may be connected to multiple serving cells at a time. For example, a UE may be connected to a primary cell (PCell) and a secondary cell (SCell) at the same time. As the UE moves within a wireless communications system, the UE may move in and out of coverage areas associated with different serving cells, and may therefore perform handover procedures from one PCell to another. In conventional wireless communications systems, handover procedures between PCells are performed via radio resource control (RRC) signaling, which is performed via Layer 3 (L3) signaling. However, performance of handover procedures via L3 signaling suffers from high latency and delay, which is not compatible with many wireless applications and services.

Accordingly, aspects of the present disclosure support techniques for performing handover procedures for PCells using Layer 2 (L2) signaling. In particular, aspects of the present disclosure are directed to medium access control-control element (MAC-CE) message structures that enable the MAC-CE messages to activate and deactivate PCells, SCells, or both, to enable handover procedures to be performed via L2 signaling. For the purposes of the present disclosure, references to different layers of signaling (e.g., L1, L2, L3) may refer to different communication layers of the user plane protocol stack (e.g., 5G protocol stack). Specifically, L2 signaling may include Service Data Adaptation Protocol (SDAP), Packet Data Convergence Protocol (PDCP), Radio Link Control (RLC) signaling, and MAC signaling. Comparatively, L3 signaling may include the RRC layer.

For example, a UE may receive an L2 message (e.g., MAC-CE) that includes a bitmap corresponding to multiple serving cells, where values of the bitmap (e.g., 0s or 1s) indicate which serving cells are activated and which are deactivated. In this example, the L2 message may also include some indication as to whether each activated serving cell is activated as a PCell or an SCell. For example, the L2 message may include a tracking reference signal (TRS) identifier (TRS ID) octet for each activated serving cell, where each TRS ID includes a bit field that indicates whether the respective serving cell is to be activated as a PCell or an SCell.

In some implementations, L2 messages described herein (e.g., MAC-CE messages) may also include an indication associated with the format of the respective L2 message. For example, a MAC-CE message may include a bit field that indicates whether the MAC-CE message is formatted for activating/deactivating only SCells (which is a legacy behavior), or whether the MAC-CE message is formatted for activating/deactivating both PCells and SCells, as described herein.

Aspects of the disclosure are initially described in the context of wireless communications systems. Additional aspects of the disclosure are described in the context of an example L2 message formats and an example process flow. Aspects of the disclosure are further illustrated by and described with reference to apparatus diagrams, system diagrams, and flowcharts that relate to techniques for L2 signaling for L1 and L2 mobility.

FIG. 1 illustrates an example of a wireless communications system 100 that supports techniques for L2 signaling for L1 and L2 mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., L3, L2) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as L1 (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for L2 signaling for L1 and L2 mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the wireless communications system 100 may support techniques for performing handover procedures for PCells using L2 signaling. In particular, the wireless communications system 100 may support different L2 message structures (e.g., MAC-CE message structures) that enable the respective L2/MAC-CE messages to activate and deactivate PCells, SCells, or both, to enable handover procedures to be performed via L2 signaling.

For example, a UE 115 of the wireless communications system 100 may receive an L2 message (e.g., MAC-CE) that includes a bitmap corresponding to multiple serving cells, where values of the bitmap (e.g., 0s or 1s) indicate which serving cells are activated and which are deactivated. In this example, the L2 message may also include some indication as to whether each activated serving cell is activated as a PCell or an SCell. For example, the L2 message may include a TRS ID octet for each activated serving cell, where each TRS ID includes a bit field that indicates whether the respective serving cell is to be activated as a PCell or an SCell. As such, the L2 message may signal for the UE 115 to deactivate the current PCell and to activate a new PCell in order to perform a handover procedure between the respective PCells.

In some implementations, L2 messages described herein (e.g., MAC-CE messages) may also include an indication associated with the format of the respective L2 message. For example, a MAC-CE message may include a bit field that indicates whether the MAC-CE message is formatted for activating/deactivating only SCells (which is a legacy behavior), or whether the MAC-CE message is formatted for activating/deactivating both PCells and SCells, as described herein.

Techniques described herein may enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

Figure 2:
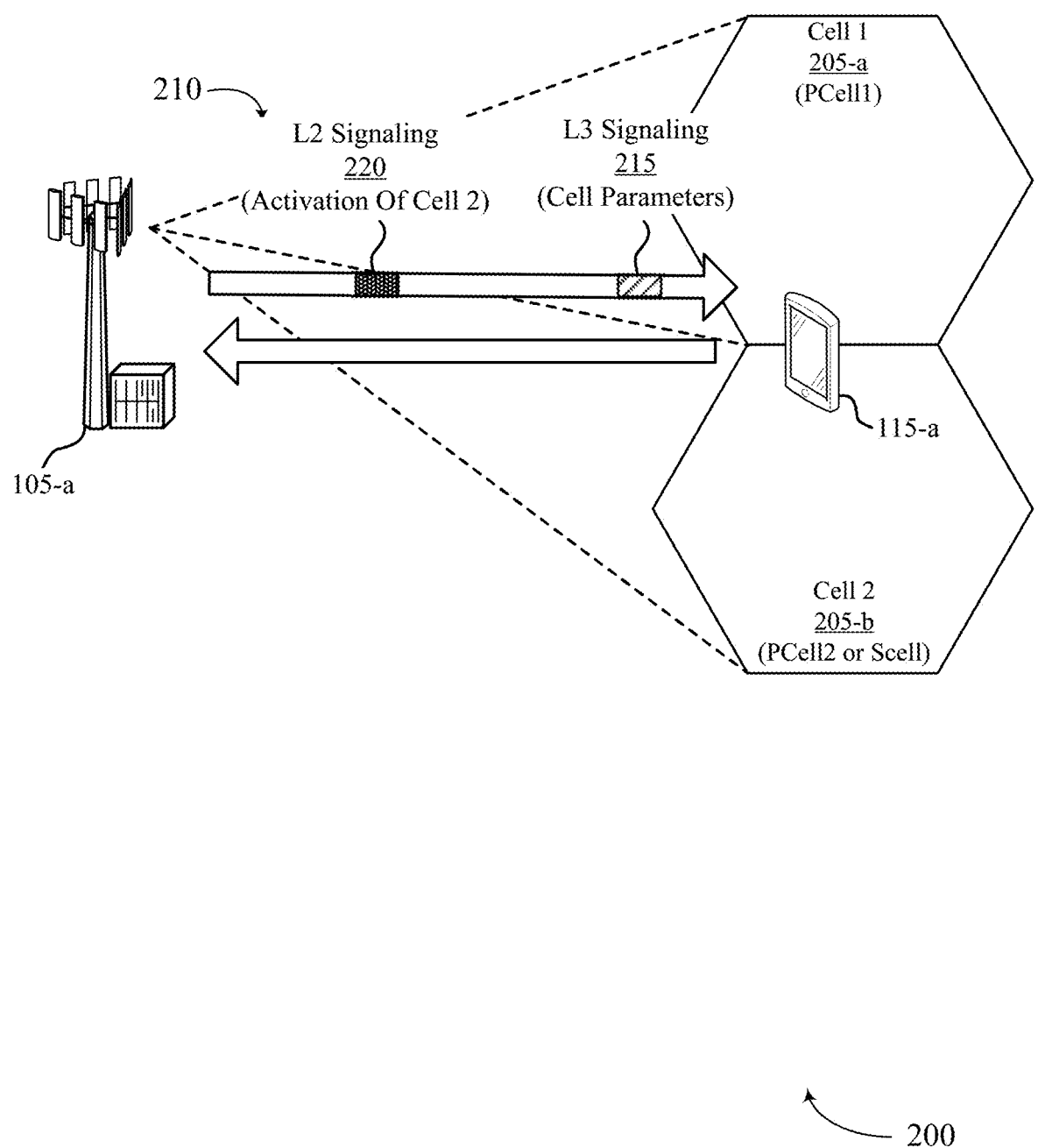
FIG. 2 illustrates an example of a wireless communications system that supports techniques for L2 signaling for L1 and L2 mobility in accordance with one or more aspects of the present disclosure.

FIG. 2 illustrates an example of a wireless communications system 200 that supports techniques for L2 signaling for L1 and L2 mobility in accordance with one or more aspects of the present disclosure. In some examples, aspects of the wireless communications system 200 may implement, or be implemented by, aspects of the wireless communications system 100. In particular, the wireless communications system 200 may support signaling that enables handovers between PCells to be performed using L2 signaling, as described with respect to FIG. 1.

The wireless communications system 200 may support wireless communications with wireless devices (e.g., UE 115-*a*) via one or more serving cells 205 of the wireless communications system 200. In particular, each serving cell 205 may be supported by one or more network entities 105 of the wireless communications system 200. For example, as shown in FIG. 2, the wireless communications system 200 may include a first serving cell 205-*a* supported by the network entity 105-*a*, and a second serving cell 205-*b* supported by the network entity 105-*a*. The serving cells 205 may include PCells, SCells, primary-secondary cells (PSCells) of a secondary cell group (SCG), or any combination thereof. For example, in some implementations, the first serving cell 205-*a* may include a PCell. The wireless communications system 200 may include any quantity of serving cells 205 supported by any quantity of network entities 105. For example, in additional or alternative cases, the first serving cell 205-*a* may be supported by the network entity 105-*a*, and the second serving cell 205-*b* may be supported by a second network entity 105 (not shown) which is different from the network entity 105-*a*.

In some aspects, the UE 115-*a* may communicate with the network entity 105-*a* (e.g., communicate with the network via the respective serving cells 205) using one or more beams, one or more carriers, one or more communications links 210, or any combination thereof. For example, each serving cell 205 may be associated with a same or different frequency range, separate beams, separate component carriers, and/or communications links to facilitate wireless communications between the UE 115-*a* and the respective serving cells 205. In some cases, the communication link 210 may include an example of an access link (e.g., a Uu link). The communication link 210 may include a bi-directional link that can include both uplink and downlink communication. For example, the UE 115-*a* may transmit uplink transmissions, such as uplink control signals or uplink data signals, to the network entity 105-*a* (e.g., to the first serving cell 205-*a* and/or the second serving cell 205-*b*) using the communication link 210, and the network entity 105-*a* may transmit downlink transmissions, such as downlink control signals or downlink data signals, to the UE 115-*a* using the communication link 210.

As noted previously herein, in some wireless communications systems, the UE 115-*a* may be connected to multiple serving cells 205 at a time. For example, the UE 115-*a* may be connected to the first serving cell 205-*a* (e.g., PCell) and the second serving cell 205-*b* (e.g., SCell) at the same time. As the UE 115-*a* moves within a wireless communications system 200, the UE 115-*a* may move in and out of coverage areas associated with different serving cells 205, and may therefore perform handover procedures from one PCell to another. For example, the UE 115-*a* may be originally in wireless communications with a first PCell (e.g., first serving cell 205-*a*), and may perform a handover procedure from the first PCell to a second (new) PCell (e.g., second serving cell 205-*b*) as the UE 115-*b* moves throughout the wireless communications system 200. Similarly, a PCell may activate and deactivate SCells at the UE 115-*a* as the UE 115-*a* moves throughout the wireless communications system 200.

In some wireless communications systems, handover procedures between SCells (e.g., handovers from one SCell to another SCell) are performed via L2 signaling, such as via MAC-CE signaling. Comparatively, in some wireless communications systems, handover procedures between PCells (e.g., handovers from one PCell to another PCell) are preformed via L3 signaling, such as via RRC signaling. However, performance of handover procedures via L3 signaling suffers from high latency and delay, which is not compatible with many wireless applications and services.

Accordingly, the wireless communications system 200 may support techniques for performing handover procedures for PCells using L2 signaling. In particular, the wireless communications system 200 may support L2 message formats/structures (e.g., MAC-CE formats) that enable the L2/MAC-CE messages to activate and deactivate PCells, SCells, or both, to enable handover procedures to be performed via L2 signaling.

For example, referring to FIG. 2, the UE 115-*a* may receive L3 control signaling 215 from the first serving cell 205-*a* (e.g., PCell1), where the L3 control signaling 215 indicates sets of parameters for PCell operation and/or SCell operation. For example, the L3 control signaling 215 may indicate candidate RRC configurations, TRS IDs, SCell configurations, PCell configurations, SPCell configurations, or any combination thereof, that may be used by the UE 115-*a* for communicating with PCells and/or SCells. Parameters for PCell/SCell operation may include, but are not limited to, resource sets (e.g., NZP CSI-RS resource sets), reference signal resources, TCI states, QCL types, and the like. The L3 control signaling 215 may include an RRC message, such as an RRC connection reconfiguration message.

For example, in some implementations, the L3 control signaling 215 (e.g., RRC message) may include a set of information elements associated with a set of candidate SCell configurations (e.g., SCellActivationRS-Config), a set of candidate PCell configurations (e.g., PCellActivationRS-Config), or both, that may be used for communications with SCells and PCells, respectively. The respective SCell and PCell configurations may each be associated with corresponding SCell identifiers (e.g., SCellActivationRS-Ids) and PCell identifiers (e.g., PCellActivationRS-Ids), respectively. In some aspects, SCell and PCell identifiers may be indicated via tracking reference signal (TRS) identifiers (TRS IDs), as will be described in further detail herein.

Other information/parameters that associated with communications with PCells and SCells that may be indicated via the L3 control signaling 215 may include, but is not limited to, resource set information, communication burst information, QCL information, and the like. For example, each SCell configuration and/or PCell configuration may include resource set information (e.g., resourceSet), such as an NZP-CSI-ResourceSetId of the NZP-CSI-RS resource set of the respective serving cell used as resource configuration for one or two bursts for SCell/PCell activation. This NZP-CSI-RS-ResourceSet may include either four NZP CSI-RS resources in two consecutive slots with two NZP CSI-RS resources in each slot, or two NZP CSI-RS resources in one slot. By way of another example, each SCell configuration and/or PCell configuration may include a gapBetweenBursts. When the gapBetweenBursts field is present for a given serving cell configuration, the field indicates that there are two bursts and indicates the gap between the two bursts in number of slots. Conversely, when the gapBetweenBursts field is absent for a given serving cell configuration, this indicates that there is a single burst.

By way of another example, each SCell configuration and/or PCell configuration may include QCL information (e.g., gel-Info), which may include a list of references to TCI states for providing the QCL source and QCL type for each NZP-CSI-RS-Resource listed in NZP-CSI-RS-Resources of the NZP-CSI-RS-ResourceSet indicated by resourceSet. Each TCI-StateId may refer to the TCI-State which has this value for tci-StateId and is defined in tci-StatesToAddModList in the PDSCH-Config included in the BWP-Downlink of the respective serving cell indicated by firstActiveDownlinkBWP-Id in the ServingCellConfig in which the respective information element is included. In some implementations, a first entry in qcl-info may correspond to first entry in nzp-CSI-RS-Resources of that NZP-CSI-RS-ResourceSet.

Continuing with reference to FIG. 2, the UE 115-a may receive L2 control signaling 220 from the first serving cell 205-a, where the L2 control signaling 220 indicates an activation of the second serving cell 205-b at the UE 115-a. In other words, the L2 control signaling 220 may instruct the UE 115-a to activate and establish wireless communications with the second serving cell 205-b. For example, as will be described in further detail with respect to FIGS. 3-7, the L2 control signaling 220 may activate the second serving cell 205-b via one or more bit field values included within a bitmap of the L2 control signaling 220. In some cases, the UE 115-a may receive (and the first serving cell 205-a may transmit) the L2 control signaling 220 based on the L3 control signaling 215.

In some aspects, the L2 control signaling 220 may include an indication (e.g., one or more bit fields) that specifies whether the second serving cell 205-b is to be activated as a PCell or an SCell. In other words, the L2 control signaling 220 may include some indication that specifies what type of serving cell 205 is to be activated. For instance, a bit field value set to "0" may indicate that the second serving cell 205-b is to be activated as an SCell, and a bit field value set to "1" may indicate that the second serving cell 205-b is to be activated as a PCell, or vice versa. The indication that specifies whether the second serving cell 205-b is to be activated as a PCell or an SCell may be indicated via the L2 control signaling 220 in any number of manners, as will be further shown and described with reference to FIGS. 3-7.

Moreover, the L2 control signaling 220 may include some indication (e.g., one or more bit fields) that indicate a format of the L2 control signaling 220. In particular, the L2 control signaling 220 may indicate whether the L2 control signaling 220 exhibits a format that is used for activating/deactivating only SCells, or whether the L2 control signaling 220 exhibits a format that is used for activating/deactivating both PCells and SCells.

In some implementations, the L2 control signaling 220 may indicate a set of parameters that are to be used for communicating with the second serving cell 205-b. In this regard, the L2 control signaling 220 may indicate one of the sets of parameters which were configured via the L3 control signaling 215 that are to be used for communicating with the second serving cell 205-b. For example, the L2 control signaling 220 may indicate a candidate RRC configurations, a TRS ID, an SCell configuration (e.g., SCellActivationRS-Id), a PCell configuration (e.g., PCellActivationRS-Id), an SPCell configuration, or any combination thereof, that may be used by the UE 115-a for communicating with the second serving cell 205-b as a PCell or an SCell.

Subsequently, the UE 115-a may activate the second serving cell 205-b as a PCell or an SCell, as indicated by the L2 control signaling 220. In this regard, the UE 115-a may activate the second serving cell 205-b based on receiving the L3 control signaling 215, receiving the L2 control signaling 220, or both. For example, in cases where the second serving cell 205-b is to be activated as a new PCell, the second serving cell 205-b may transmit a message to the UE 115-a, where the message indicates an activation and/or completion of a handover procedure to the second serving cell 205-b (e.g., PCell update confirmation). In cases where the second serving cell 205-b is to be activated as a new PCell, the UE 115-a may deactivate first serving cell 205-a as the PCell based on activating the second serving cell 205-b as the new PCell (e.g., only one PCell at a time). However, in some wireless communications systems that allow for multi-PCell operation, the UE 115-a may activate the second serving cell 205-b as a new PCell, while maintaining also the first serving cell 205-a as a PCell (e.g., two PCells at the same time).

In cases where the second serving cell 205-b is activated as a new PCell, the UE 115-a and the first serving cell 205-a may deactivate the first serving cell 205-a at the UE 115-a. For example, in cases where the L2 control signaling 220 activates the second serving cell 205-b as a new PCell, the L2 control signaling 220 may also include an indication for the UE 115-a to deactivate the first serving cell 205-a. In this regard, the UE 115-a and the first serving cell 205—may deactivate the first serving cell 205-a at the UE 115-a based on receiving/transmitting the L3 control signaling 215, receiving/transmitting the L2 control signaling 220, activating the second serving cell 205-b as a new PCell, or any combination thereof. Additionally, or alternatively, as discussed previously herein, in some wireless communications systems that allow for multi-PCell operation, the UE 115-a may activate the second serving cell 205-b as a new PCell, while maintaining also the first serving cell 205-a as a PCell (e.g., two PCells at the same time).

The UE 115-a may communicate with the second serving cell 205-b as a PCell or an SCell, as indicated by the L2 control signaling 220. In particular, the UE 115-a may communicate with the second serving cell 205-b in accordance with a set of parameters (e.g., SCellActivationRS-Config, PCellActivationRS-Config) indicated by the L3 control signaling 215 and/or the L2 control signaling 220.

Techniques described herein may enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

Figure 3:
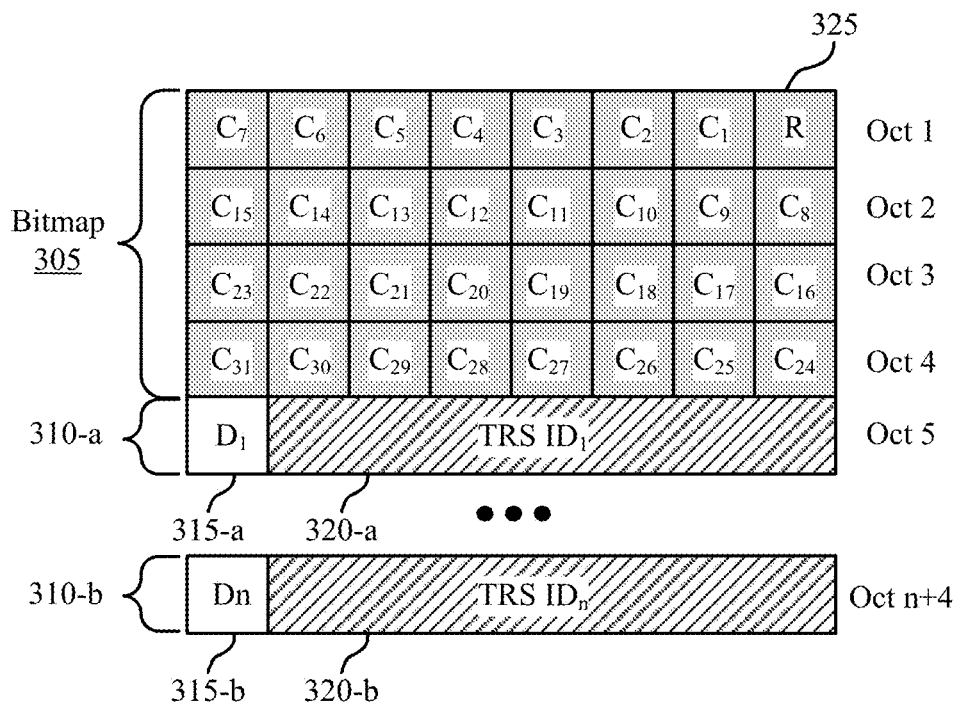
FIG. 3 illustrates an example of an L2 message format that supports techniques for L2 signaling for L1 and L2 mobility in accordance with one or more aspects of the present disclosure.

FIG. 3 illustrates an example of an L2 message format 300 that supports techniques for L2 signaling for L1 and L2 mobility in accordance with one or more aspects of the present disclosure. In some examples, aspects of the L2 message format 300 may implement, or be implemented by, aspects of the wireless communications system 100, the wireless communications system 200, or both. In particular, the L2 message format 300 may be used to perform handover procedures between PCells, SCells, or both, as described with reference to FIGS. 1-2, among other aspects.

The L2 message format 300 illustrated in FIG. 3 illustrates an example format of an L2 message (e.g., MAC-CE), as illustrated via the L2 control signaling 220 in FIG. 2. In particular, the L2 message format 300 illustrates an example MAC-CE format that may be used to activate/deactivate both PCells and SCells, and for performing handover procedures between PCells (e.g., L1/L2 mobility). In this regard, the L2 message format 300 illustrates an enhanced MAC-CE format for PCell/SCell activation and deactivation, as described herein.

The L2 message format 300 may include a bitmap 305 including a set of bit fields ($C_n$ bit fields) corresponding to a set of serving cells that may be activated/deactivated at a UE 115. In this regard, the bitmap 305 includes bit fields corresponding to 31 different serving cells (e.g., $C_1$-$C_{31}$). The bitmap 305 may span a set of octets of the L2 message format 300 (e.g., Octets 1-5). Octets 1-4 of the L2 message format 300 may be referred to as "Step 1" when activating and deactivating respective serving cells with serving cell ID i between 1 and 31.

In some aspects, the $C_n$ bit fields of the bitmap 305 may include binary bits, where a bit field value of "0" refers to a deactivated serving cell index, and a bit field value of "1" refers to an activated serving cell index. For example, the $C_1$ bit field may correspond to a first serving cell, and the $C_2$ bit field may correspond to a second serving cell. In this example, if $C_1$=1 and $C_2$=0, this may indicate that the first serving cell is (or is expected to be) activated, where the second serving cell is (or is expected to be) deactivated. As such, different values of the bit fields within the bitmap 305 may be used to activate and deactivate different serving cells at the UE 115.

In some aspects, the L2 message format 300 may include one or more bit field values that indicate the format of the respective L2/MAC-CE message. In particular, the L2 message format 300 may include one or more bit field values that indicate whether the respective L2/MAC-CE message includes a format capable of activating/deactivating only SCells (e.g., legacy format), or whether the respective L2/MAC-CE message includes a format capable of activating/deactivating both PCells and SCells. For example, as shown in FIG. 3, a bit field 325 (e.g., the R bit field) may be set to "0" to indicate that the respective L2/MAC-CE message includes a format capable of activating/deactivating only SCells, and may be set to "1" to indicate that the respective L2/MAC-CE message includes a format capable of activating/deactivating both PCells and SCells.

Similarly, in some implementations, the L2 message format 300 (e.g., L2 control signaling, MAC-CE message) may be associated with a logical channel identifier (LCID) indicating a message format that is associated with activation/deactivation of PCells and/or SCells. That is, the L2 message format 300 may be associated with a different LCID as compared to other L2 message formats that are only configured for activating/deactivating SCells.

For each activated serving cell indicated in the bitmap 305 (e.g., for each serving cell with $C_n$=1 indicating an activated serving cell), the L2 message format 300 may include an extra set of bit fields 310 (e.g., an extra octet) that indicates information associated with the activated serving cell. For example, if the bitmap 305 indicates three serving cells are active (or are set to be activated), the L2 message format 300 may indicate three extra sets of bit fields 310 that indicate information for each of the respective activated serving cells. The extra set of bit fields 310 may indicate whether the respective serving cell is to be activated as an SCell or a PCell, and may indicate parameters associated with the respective activated serving cell.

For example, the bitmap 305 may indicate a first serving cell and a second serving cell are to be activated. As such, the L2 message format 300 may include a first set of bit fields 310-a associated with the first activated serving cell, and a second set of bit fields 310-b associated with the second activated serving cell. The first set of bit fields 310-a may include a first bit field 315-a that is used to indicate whether the first serving cell is to be activated as a PCell or an SCell, and a subset of bit fields 320-a (e.g., seven remaining bit fields) that are used to indicate parameters (e.g., a first TRS ID) for the first serving cell. Similarly, the second set of bit fields 310-b may include a first bit field 315-b that is used to indicate whether the second serving cell is to be activated as a PCell or an SCell, and a subset of bit fields 320-b (e.g., seven remaining bit fields) that are used to indicate parameters (e.g., a second TRS ID) for the second serving cell. Thus, for each extra octet (e.g., each extra set of bit fields 310) for each activated serving cell, it is possible to choose from up to 128 RRC different PCell or SCell configurations.

In this regard, for each activated serving cell, the L2 message format 300 may include an extra octet (e.g., extra set of bit fields 310, shown in Octet 5 and Octet n+4), where a first bit field (e.g., binary bit fields 315) of each extra octet is used to indicate whether the respective serving cell is a PCell or an SCell, and where the remainder of each respective octet (e.g., bit fields 320) are used to indicate an TRS ID information that refers to a given RRC configuration information element. In other words, the set of bit fields 320 within each extra octet may indicate an SCellActivationRS-Id or a PCellActivationRS-Id for the respective activated cell. As such, Octets 5 and n+4 of the L2 message format 300 may be referred to as "Step 2" when activating and deactivating respective serving cells.

Figure 4:
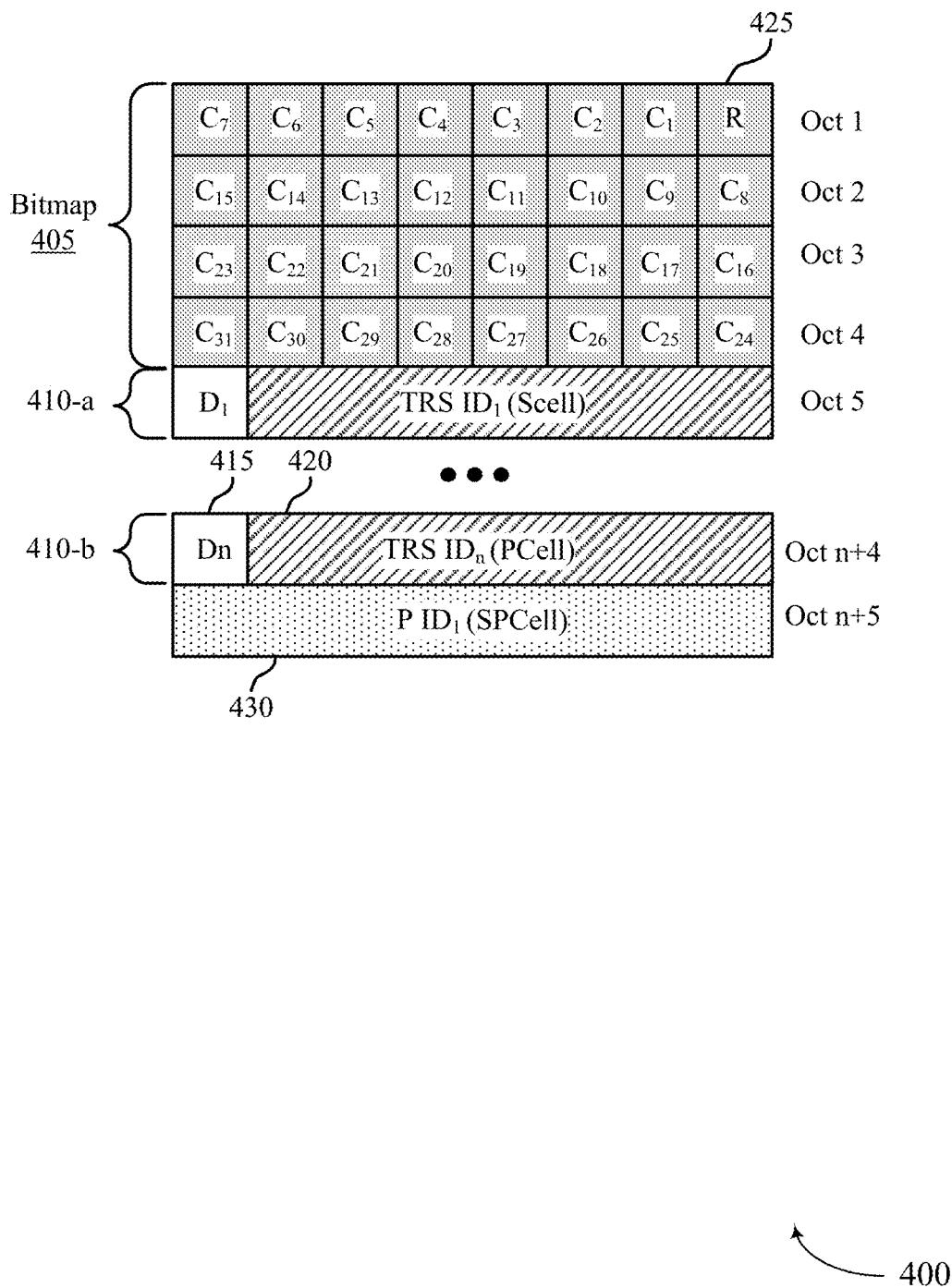
FIG. 4 illustrates an example of an L2 message format that supports techniques for L2 signaling for L1 and L2 mobility in accordance with one or more aspects of the present disclosure.

FIG. 4 illustrates an example of an L2 message format 400 that supports techniques for L2 signaling for L1 and L2 mobility in accordance with one or more aspects of the present disclosure. In some examples, aspects of the L2 message format 400 may implement, or be implemented by, aspects of the wireless communications system 100, the wireless communications system 200, the L2 message format 300, or any combination thereof. In particular, the L2 message format 400 may be used to perform handover procedures between PCells, SCells, or both, as described with reference to FIGS. 1-3, among other aspects.

The L2 message format 400 illustrated in FIG. 4 illustrates an example format of an L2 message (e.g., MAC-CE), as illustrated via the L2 control signaling 220 in FIG. 2. In particular, the L2 message format 400 illustrates an example MAC-CE format that may be used to activate/deactivate both PCells and SCells, and for performing handover procedures between PCells (e.g., L1/L2 mobility). In this regard, the L2 message format 400 illustrates an enhanced MAC-CE format for PCell/SCell activation and deactivation, as described herein.

As noted previously herein with respect to FIG. 3, the L2 message format 400 may include a bitmap 405 that is used to indicate activated/deactivated serving cells, and a bit field 425 that may be used to indicate whether the L2 message format 400 is capable of activating/deactivating only SCells, or whether the L2 message format 400 is capable of activating/deactivating both SCells and PCells. Moreover, as described with reference to FIG. 3, the L2 message format 400 may include an extra set of bit fields 410 for each activated serving cell (e.g., first set of bit fields 410-*a* for a first activated serving cell, second set of bit fields 410-*b* for a second activated serving cell). For each set of bit fields 410 corresponding to an activated serving cell, a first bit 415 of each extra set of bit fields 410 may indicate whether the respective serving cell is to be activated as a PCell or an SCell, and a subset of bit fields 420 may be used to indicate parameters (e.g., SCell TRS ID, PCell TRS ID) for the respective activated serving cell.

As compared to the L2 message format 300 illustrated in FIG. 3, the L2 message format 400 illustrated in FIG. 4 may include an additional set of bit fields 430 (e.g., extra octet) corresponding to the serving cell that is to be activated at the UE 115 as a PCell (where there is usually only one activated PCell at the UE 115). In some aspects, the additional set of bit fields 430 (extra octet) may indicate a primary ID that points to a specific special cell (SPCell) configuration for the activated PCell (e.g., indicates an SPCell RRC configuration information element). Thus, using the additional octet (e.g., additional set of bit fields 430) for the activated PCell, it is possible to choose from up to 256 different RRC SPCell configurations.

For example, as shown in FIG. 4, the L2 message format 400 may activate a serving cell using the bitmap 405, and an extra set of bit fields 410-*b* (Octet n+4) corresponding to the activated serving cell may include a first bit 415 that indicates the serving cell is to be activated as a PCell, and a subset of bit fields 420 that indicate a PCell TRS ID associated with the PCell. Additionally, the L2 message format 400 may include an additional set of may therefore include an extra set of bit fields 430 (Octet n+5) for the activated PCell, where the extra set of bit fields 430 indicate an SPCell configuration for the activated PCell.

As such, Octets 1-4 of the L2 message format 400 may be referred to as "Step 1" used to indicate activated/deactivated serving cells. Moreover, Octets 5 and n+4 of the L2 message format 400 may be referred to as "Step 2" used to indicate SCell/PCell configurations for the activated serving cells, and Octet n+5 may be referred to as "Step 3" used to indicate the SPCell configuration for the activated PCell.

Figure 5:
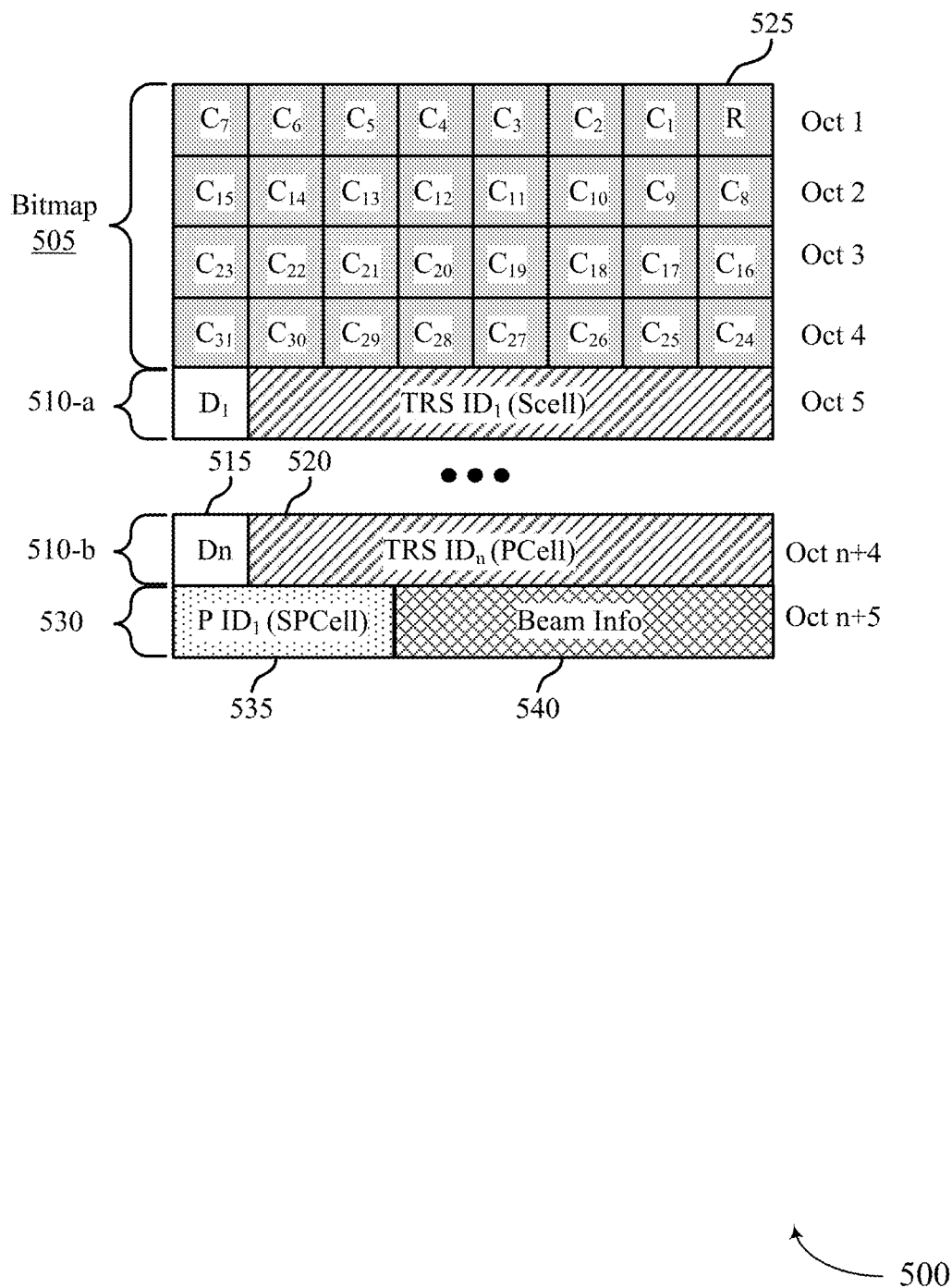
FIG. 5 illustrates an example of an L2 message format that supports techniques for L2 signaling for L1 and L2 mobility in accordance with one or more aspects of the present disclosure.

FIG. 5 illustrates an example of an L2 message format 500 that supports techniques for L2 signaling for L1 and L2 mobility in accordance with one or more aspects of the present disclosure. In some examples, aspects of the L2 message format 500 may implement, or be implemented by, aspects of the wireless communications system 100, the wireless communications system 200, the L2 message formats 300-400, or any combination thereof. In particular, the L2 message format 500 may be used to perform handover procedures between PCells, SCells, or both, as described with reference to FIGS. 1-4, among other aspects.

The L2 message format 500 illustrated in FIG. 5 illustrates an example format of an L2 message (e.g., MAC-CE), as illustrated via the L2 control signaling 220 in FIG. 2. In particular, the L2 message format 500 illustrates an example MAC-CE format that may be used to activate/deactivate both PCells and SCells, and for performing handover procedures between PCells (e.g., L1/L2 mobility). In this regard, the L2 message format 500 illustrates an enhanced MAC-CE format for PCell/SCell activation and deactivation, as described herein.

As noted previously herein with respect to FIGS. 3 and 4, the L2 message format 500 may include a bitmap 505 that is used to indicate activated/deactivated serving cells, and a bit field 525 that may be used to indicate whether the L2 message format 500 is capable of activating/deactivating only SCells, or whether the L2 message format 500 is capable of activating/deactivating both SCells and PCells. Moreover, as described with reference to FIGS. 3 and 4, the L2 message format 500 may include an extra set of bit fields 510 for each activated serving cell (e.g., first set of bit fields 510-*a* for a first activated serving cell, second set of bit fields 510-*b* for a second activated serving cell). For each set of bit fields 510 corresponding to an activated serving cell, a first bit 515 of each extra set of bit fields 510 may indicate whether the respective serving cell is to be activated as a PCell or an SCell, and a subset of bit fields 520 may be used to indicate parameters (e.g., SCell TRS ID, PCell TRS ID) for the respective activated serving cell.

As described previously herein with respect to the L2 message format 400 illustrated in FIG. 4, the L2 message format 500 illustrated in FIG. 5 may include an additional set of bit fields 530 (e.g., extra octet) corresponding to the serving cell that is to be activated at the UE 115 as a PCell (where there is usually only one activated PCell at the UE 115). However, as compared to the L2 message format 400 illustrated in FIG. 4, the additional set of bit fields 530 may be subdivided up to indicate both an SPCell configuration and beam information for the activated PCell.

For example, as shown in FIG. 5, the additional set of bit fields 530 may include a first subset of bit fields 535 (e.g., X bits) that are used to indicate a primary ID that points to a specific special cell (SPCell) configuration for the activated PCell (e.g., indicates an SPCell RRC configuration information element). Additionally, the additional set of bit fields 530 may include a second subset of bit fields 540 (e.g., Y reserved bits) that are used to indicate beam information a for the activated PCell, such as additional beam refinement information (e.g., TCI states, reference signals, etc.). In some cases, the first subset of bit fields 535 may include three bits of the extra octet (Octet n+5), and the second subset of bit fields 540 may include five bits of the extra octet.

As such, Octets 1-4 of the L2 message format 500 may be referred to as "Step 1" used to indicate activated/deactivated serving cells. Moreover, Octets 5 and n+4 of the L2 message format 500 may be referred to as "Step 2" used to indicate SCell/PCell configurations for the activated serving cells, and Octet n+5 may be referred to as "Step 3" used to indicate the SPCell configuration and the beam information for the activated PCell.

Figure 6:
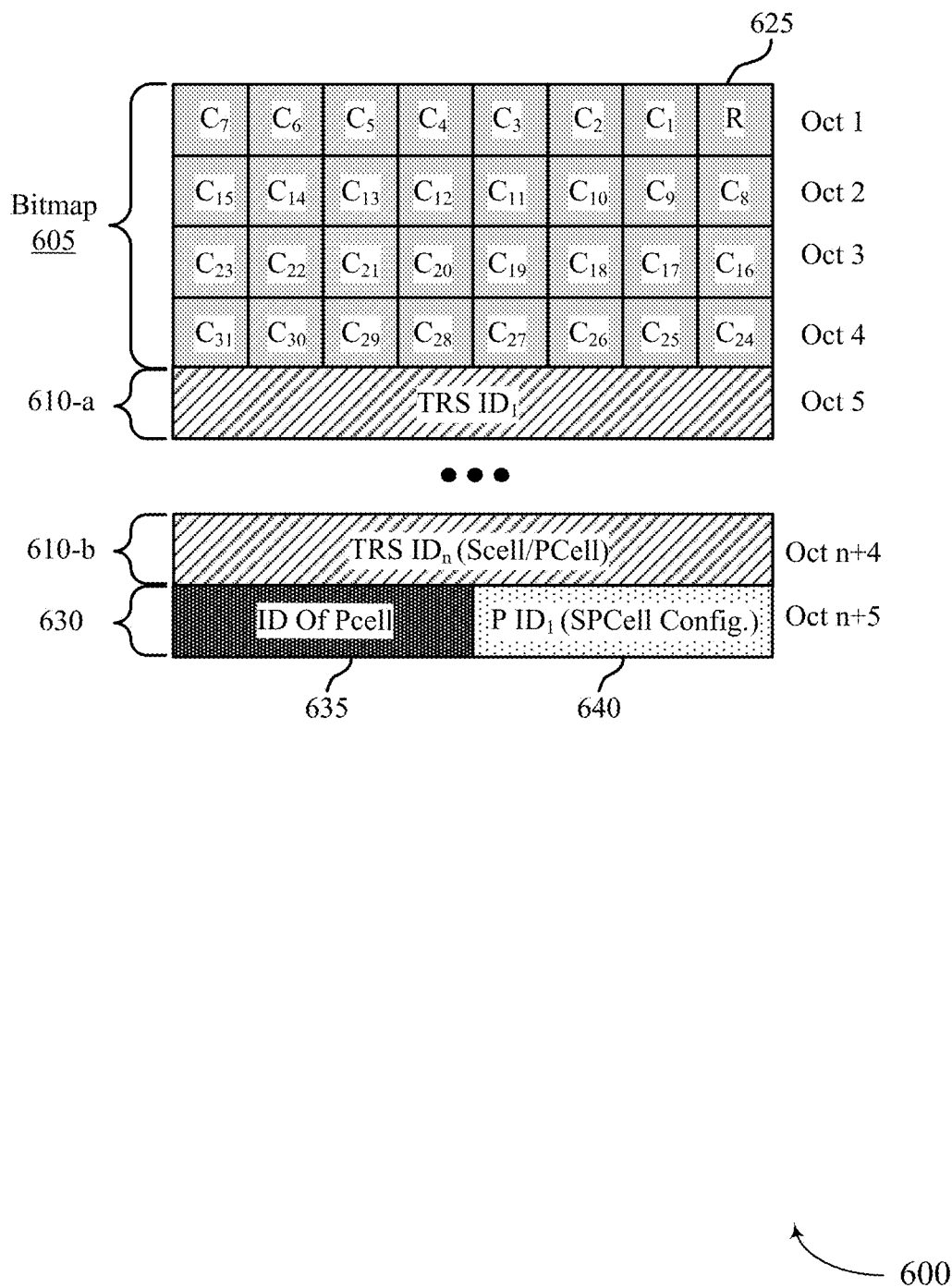
FIG. 6 illustrates an example of an L2 message format that supports techniques for L2 signaling for L1 and L2 mobility in accordance with one or more aspects of the present disclosure.

FIG. 6 illustrates an example of an L2 message format 600 that supports techniques for L2 signaling for L1 and L2 mobility in accordance with one or more aspects of the present disclosure. In some examples, aspects of the L2 message format 600 may implement, or be implemented by, aspects of the wireless communications system 100, the wireless communications system 200, the L2 message formats 300-500, or any combination thereof. In particular, the L2 message format 600 may be used to perform handover procedures between PCells, SCells, or both, as described with reference to FIGS. 1-5, among other aspects.

The L2 message format 600 illustrated in FIG. 6 illustrates an example format of an L2 message (e.g., MAC-CE), as illustrated via the L2 control signaling 220 in FIG. 2. In particular, the L2 message format 600 illustrates an example MAC-CE format that may be used to activate/deactivate both PCells and SCells, and for performing handover procedures between PCells (e.g., L1/L2 mobility). In this regard, the L2 message format 600 illustrates an enhanced MAC-CE format for PCell/SCell activation and deactivation, as described herein.

As noted previously herein with respect to FIGS. 3-5, the L2 message format 600 may include a bitmap 605 that is used to indicate activated/deactivated serving cells, and a bit field 625 that may be used to indicate whether the L2 message format 600 is capable of activating/deactivating only SCells, or whether the L2 message format 600 is capable of activating/deactivating both SCells and PCells. Moreover, as described with reference to FIGS. 3-5, the L2 message format 600 may include an extra set of bit fields 610 for each activated serving cell (e.g., first set of bit fields 610-*a* for a first activated serving cell, second set of bit fields 610-*b* for a second activated serving cell).

As compared to the extra sets of bit fields 310, 410, 510 corresponding to each activated serving cell, the extra set of bit fields 610-*a* in FIG. 6 may utilize each of the bit fields (e.g., all eight bits of each extra octet) to indicate the TRS ID of the respective activated serving cell. For example, in cases where the bitmap 605 activates a first serving cell and a second serving cell, the L2 message format 600 may include a first extra set of bit fields 610-*a* (e.g., Octet 5) indicating the TRS ID that points to RRC configuration information element for the first serving cell, and a second extra set of bit fields 610-*b* (e.g., Octet n+4) indicating the TRS ID that points to RRC configuration information element for the second serving cell. Thus, for each extra octet corresponding to each activated serving cell, it is possible to choose from up to 256 different RRC configurations for SCells and PCells.

Moreover, for each activated PCell, the L2 message format 600 may include an additional set of bit fields 630 used to indicate additional information associated with the activated PCell. For example, as shown in FIG. 6, the additional set of bit fields 630 may include a first subset of bit fields 635 (e.g., X bits) that are used to indicate a cell ID/index of the activated PCell. In this regard, by indicating the cell ID of the serving cell that is to be activated as a PCell, the UE 115 may be configured to determine that all other activated serving cells are to be activated as SCells.

Additionally, the additional set of bit fields 630 may include a second subset of bit fields 640 (e.g., Y reserved bits) that are used to indicate a primary ID that points to a specific special cell (SPCell) configuration for the activated PCell (e.g., indicates an SPCell RRC configuration information element). In such cases, the second subset of bit fields 640 may be able to indicate up to $2^Y$ different RRC SPCell configurations. The first subset of bit fields 635 may include five bit fields (for the 31 cell identifiers within the bitmap 605), and the second subset of bit fields 640 may include three bits of the extra octet.

As such, Octets 1-4 of the L2 message format 600 may be referred to as "Step 1" used to indicate activated/deactivated serving cells. Moreover, Octets 5 and n+4 of the L2 message format 600 may be referred to as "Step 2" used to indicate SCell/PCell configurations for the activated serving cells, and Octet n+5 may be referred to as "Step 3" used to indicate the cell ID/index and the SPCell configuration for the activated PCell.

Figure 7:
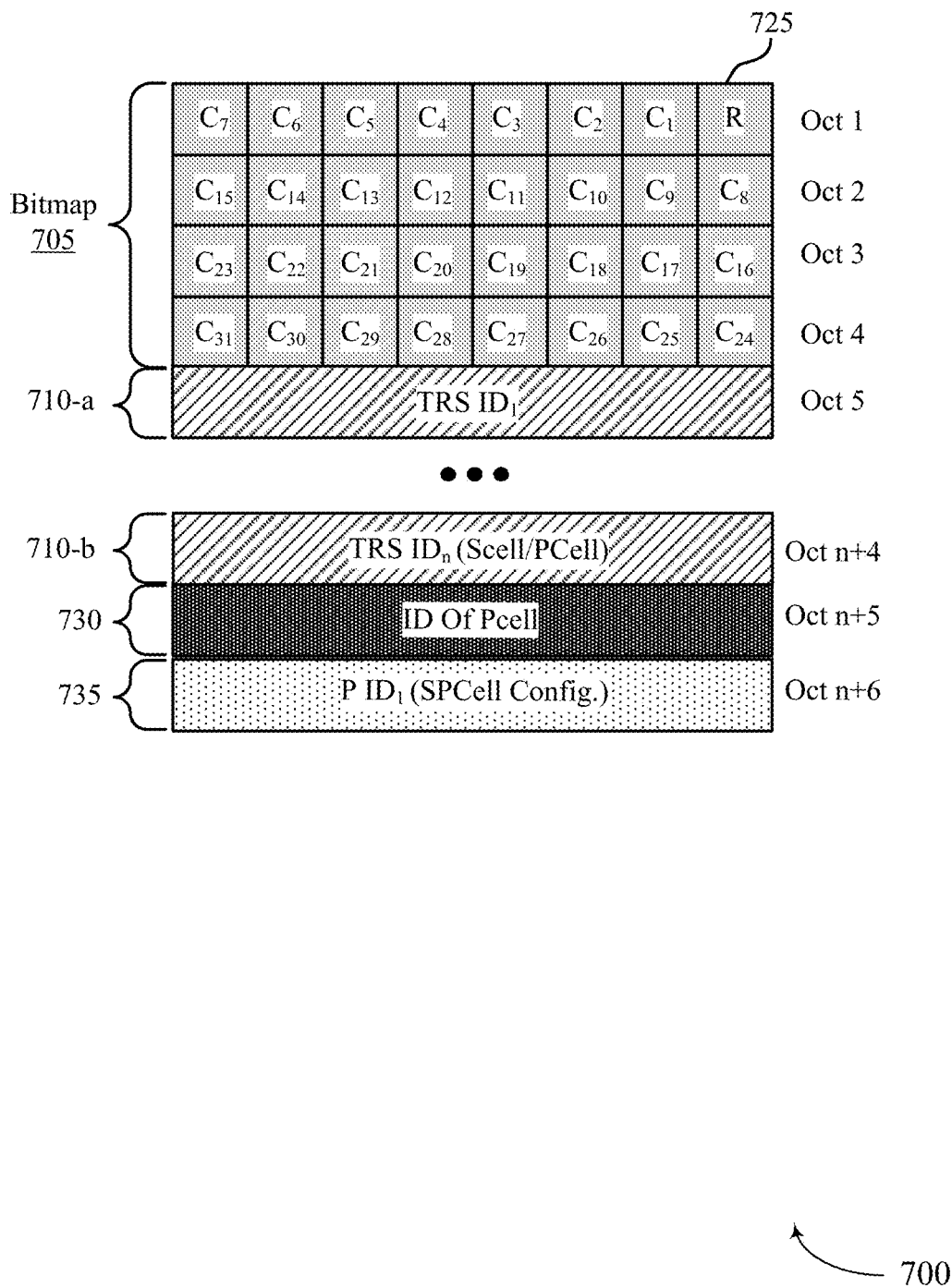
FIG. 7 illustrates an example of an L2 message format that supports techniques for L2 signaling for L1 and L2 mobility in accordance with one or more aspects of the present disclosure.

FIG. 7 illustrates an example of an L2 message format 700 that supports techniques for L2 signaling for L1 and L2 mobility in accordance with one or more aspects of the present disclosure. In some examples, aspects of the L2 message format 700 may implement, or be implemented by, aspects of the wireless communications system 100, the wireless communications system 200, the L2 message formats 300-600, or any combination thereof. In particular, the L2 message format 700 may be used to perform handover procedures between PCells, SCells, or both, as described with reference to FIGS. 1-6, among other aspects.

The L2 message format 700 illustrated in FIG. 6 illustrates an example format of an L2 message (e.g., MAC-CE), as illustrated via the L2 control signaling 220 in FIG. 2. In particular, the L2 message format 700 illustrates an example MAC-CE format that may be used to activate/deactivate both PCells and SCells, and for performing handover procedures between PCells (e.g., L1/L2 mobility). In this regard, the L2 message format 700 illustrates an enhanced MAC-CE format for PCell/SCell activation and deactivation, as described herein.

As noted previously herein with respect to FIGS. 3-6, the L2 message format 700 may include a bitmap 705 that is used to indicate activated/deactivated serving cells, and a bit field 725 that may be used to indicate whether the L2 message format 700 is capable of activating/deactivating only SCells, or whether the L2 message format 700 is capable of activating/deactivating both SCells and PCells. Moreover, as described with reference to FIGS. 3-6, the L2 message format 700 may include an extra set of bit fields 710 for each activated serving cell (e.g., first set of bit fields 710-*a* for a first activated serving cell, second set of bit fields 710-*b* for a second activated serving cell).

Similarly to the L2 message format 600 illustrated in FIG. 6, the L2 message format 700 illustrated in FIG. 7 may utilize each of the bit fields (e.g., all eight bits of each extra octet) for each additional set of bit fields 710 to indicate the TRS ID of the respective activated serving cell. For example, in cases where the bitmap 705 activates a first serving cell and a second serving cell, the L2 message format 700 may include a first extra set of bit fields 710-*a* (e.g., Octet 5) indicating the TRS ID that points to RRC configuration information element for the first serving cell, and a second extra set of bit fields 710-*b* (e.g., Octet n+4) indicating the TRS ID that points to RRC configuration information element for the second serving cell. Thus, for each extra octet corresponding to each activated serving cell, it is possible to choose from up to 256 different RRC configurations for SCells and PCells.

However, as compared to the L2 message format 600 illustrated in FIG. 6, in which case the cell ID/index and the SPCell configuration are indicated within the same extra octet (e.g., within set of bit fields 630), the L2 message format 700 illustrated in FIG. 7 may utilize different octets (e.g., different sets of bit fields) to indicate the cell ID/index of the PCell and the SPCell configuration of the PCell.

For example, as shown in FIG. 7, the L2 message format 700 may include a set of bit fields 730 (e.g., extra Octet n+5) to indicate the cell ID/index associated with the PCell. Additionally, as shown in FIG. 7, the L2 message format 700 may include a separate set of bit fields 735 (e.g., extra Octet n+6) to indicate a primary ID that points to a specific special cell (SPCell) configuration for the activated PCell (e.g., indicates an SPCell RRC configuration information element). In this regard, for the activated PCell, the L2 message format 700 may include two extra octets indicating information associated with the activated PCell (e.g., a first extra octet to indicate the cell ID, and a second extra octet to indicate the SPCell configuration). In some aspects, the set of bit fields 730 and/or the set of bit fields 735 may each include some quantity reserved bits (R≥0 bits).

As such, Octets 1-4 of the L2 message format 700 may be referred to as "Step 1" used to indicate activated/deactivated serving cells. Moreover, Octets 5 and n+4 of the L2 message format 700 may be referred to as "Step 2" used to indicate SCell/PCell configurations for the activated serving cells. Further, Octet n+5 and Octet n+6 may be referred to as "Step 3" used to indicate the cell ID/index and the SPCell configuration for the activated PCell.

Figure 8:
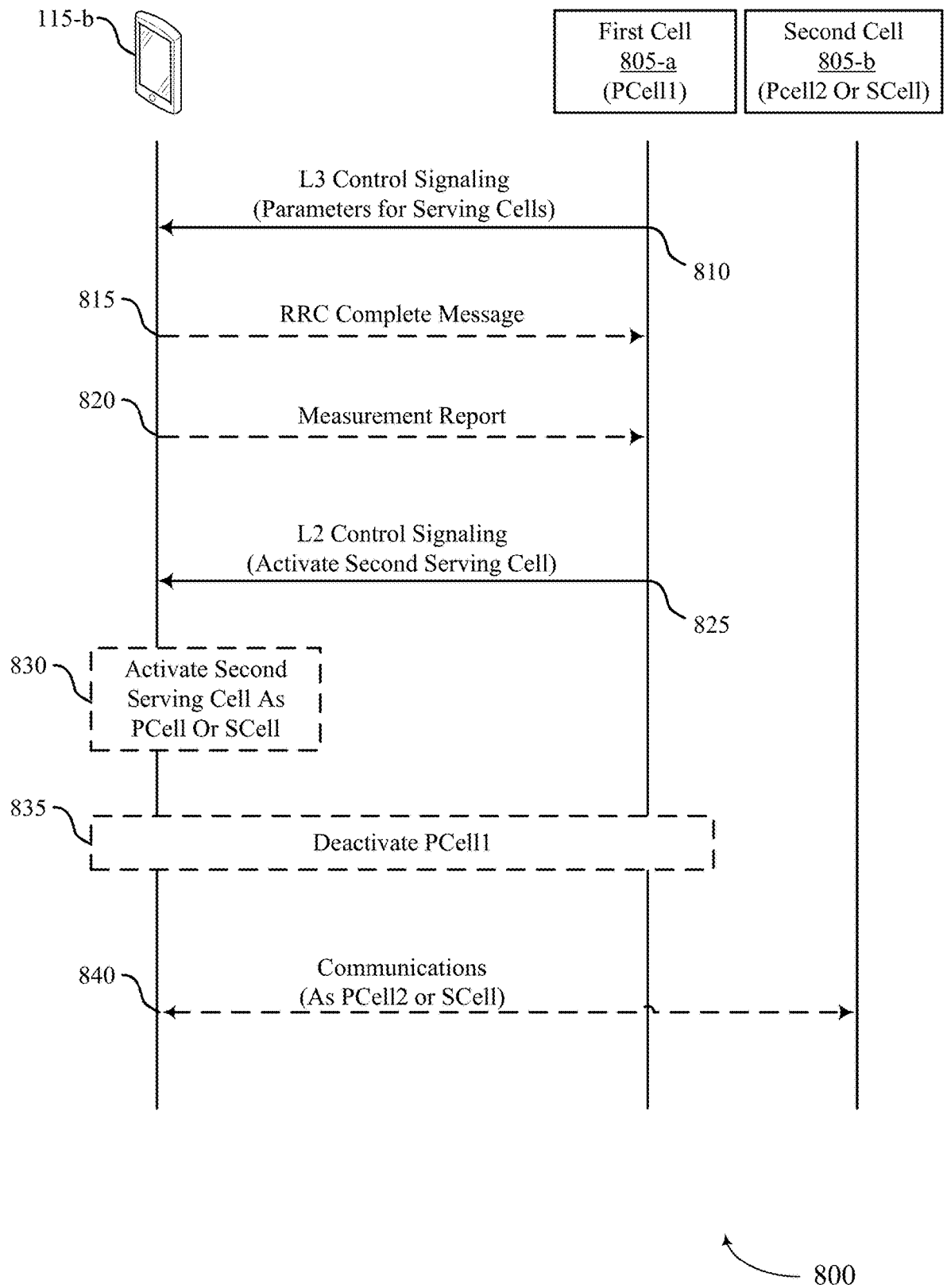
FIG. 8 illustrates an example of a process flow that supports techniques for L2 signaling for L1 and L2 mobility in accordance with one or more aspects of the present disclosure.

FIG. 8 illustrates an example of a process flow 800 that supports techniques for L2 signaling for L1 and L2 mobility in accordance with one or more aspects of the present disclosure. In some examples, aspects of the process flow 800 may implement, or be implemented by, aspects of the wireless communications system 100, the wireless communications system 200, the L2 message formats 300-700, or any combination thereof. In particular, the process flow 800 illustrates signaling between a UE 115-b and serving cells that enables handover procedures between PCells, SCells, or both, to be performed via L2 signaling, as described with reference to FIGS. 1-7, among other aspects.

The process flow 800 may include a UE 115-b, a first serving cell 805-a, and a second serving cell 805-b, which may be examples of UEs 115, network entities 105, serving cells 205, and other wireless devices described with reference to FIGS. 1-7. For example, the UE 115-b illustrated in FIG. 7 may include an example of the UE 115-a illustrated in FIG. 2. Similarly, the first serving cell 805-a and the second serving cell 805-b illustrated in FIG. 7 may include an example of the first serving cell 205-a and the second serving cell 205-b, respectively, as illustrated in FIG. 2. In this regard, the first serving cell 805-a may include a first PCell (e.g., PCell1), where the second serving cell 805-b may be activated as either a second/new PCell or an SCell. In cases where the second serving cell 805-b is to be activated as a new PCell, the UE 115-b may deactivate first serving cell 805-a as the PCell based on activating the second serving cell 805-b as the new PCell (e.g., only one PCell at a time). However, in some wireless communications systems that allow for multi-PCell operation, the UE 115-b may activate the second serving cell 805-b as a new PCell, while maintaining also the first serving cell 805-a as a PCell (e.g., two PCells at the same time). In some aspects, the first serving cell 805-a and the second serving cell 805-b may be associated with (e.g., supported by) the same network entity 105 or different network entities 105.

In some examples, the operations illustrated in process flow 800 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 810, the UE 115-b may receive L3 control signaling from the first serving cell 805-a (e.g., PCell1), where the L3 control signaling indicates sets of parameters for PCell operation and/or SCell operation. For example, the L3 control signaling may indicate candidate RRC configurations, TRS IDs, SCell configurations, PCell configurations, SPCell configurations, or any combination thereof, that may be used by the UE 115-b for communicating with PCells and/or SCells. Parameters for PCell/SCell operation may include, but are not limited to, resource sets (e.g., NZP CSI-RS resource sets), reference signal resources, TCI states, QCL types, and the like. The L3 control signaling may include an RRC message, such as an RRC connection reconfiguration message.

At 815, the UE 115-b may transmit an RRC complete message to the first serving cell 805-a. The UE 115-b may transmit the RRC complete message (e.g., RRC connection reconfiguration complete message) in response to receiving the L3 control signaling at 810.

At 820, the UE 115-b may transmit a measurement report to the first serving cell 805-a. The measurement report may include an L1 measurement report, such as an RSRP measurement report. The L1 measurement report may include measurements performed by the UE 115-b on signals received from different serving cells 805, such as the first serving cell 805-a, the second serving cell 805-b, and the like. Measurements included in the measurement report may be associated with serving cells 805 that are currently activated at the UE 115-b (such as the first serving cell 805-a), serving cells that are not currently activated at the UE 115-b (such as the second serving cell 805-b) (e.g., candidate serving cells), or both. In this regard, the L1 measurement report may be used by the first serving cell 805-a to evaluate a relative quality of wireless communications between the UE 115-b and other serving cells 805, and to determine whether to trigger handover procedures to other serving cells 805.

The UE 115-b may be configured to transmit measurement reports periodically, aperiodically, dynamically, or any combination thereof. For example, in some cases, the UE 11-b may receive an indication of a set of resources usable by the UE 115-b for transmitting measurement reports in accordance with an indicated periodicity. Additionally, or alternatively, the UE 115-b may transmit the measurement report in response to a request or other trigger received from the first serving cell 805-a. Moreover, in other cases, the UE 115-b may transmit the measurement report when certain conditions are met, such as when the UE 115-b identifies another serving cell 805 that exhibits a threshold quality or performance of wireless communications.

At 825, the UE 115-b may receive L2 control signaling from the first serving cell 805-a, where the L2 control signaling indicates an activation of the second serving cell 805-b at the UE 115-b. In other words, the L2 control signaling may instruct the UE 115-b to activate and establish wireless communications with the second serving cell 805-

*b*. For example, as shown in FIGS. 3-7, the L2 control signaling may activate the second serving cell 805-*b* via one or more bit field values included within a bitmap of the L2 control signaling. The UE 115-*b* may receive (and the first serving cell 805-*a* may transmit) the L2 control signaling based on the L3 control signaling at 810, the RRC message at 815, the measurement report at 820, or any combination thereof. For example, the first serving cell 805-*a* may transmit the L2 control signaling activating the second serving cell 805-*b* in response to receiving the measurement report at 820.

In some aspects, the L2 control signaling may include an indication (e.g., one or more bit fields) that specifies whether the second serving cell 805-*b* is to be activated as a PCell or an SCell. In other words, the L2 control signaling may include some indication that specifies what type of serving cell 805 is to be activated. For instance, a bit field value set to "0" may indicate that the second serving cell 805-*b* is to be activated as an SCell, and a bit field value set to "1" may indicate that the second serving cell 805-*b* is to be activated as a PCell, or vice versa. The indication that specifies whether the second serving cell 805-*b* is to be activated as a PCell or an SCell may be indicated via the L2 control signaling in any number of manners, as shown and described in FIGS. 3-7.

Moreover, the L2 control signaling may include some indication (e.g., one or more bit fields) that indicate a format of the L2 control signaling. In particular, the L2 control signaling may indicate whether the L2 control signaling exhibits a format that is used for activating/deactivating only SCells, or whether the L2 control signaling exhibits a format that is used for activating/deactivating both PCells and SCells.

In some implementations, the L2 control signaling may indicate a set of parameters that are to be used for communicating with the second serving cell 805-*b*. In this regard, the L2 control signaling may indicate one of the sets of parameters which were configured via the L3 control signaling at 810 that are to be used for communicating with the second serving cell 805-*b*. For example, the L2 control signaling may indicate a candidate RRC configurations, a TRS ID, an SCell configuration, a PCell configuration, an SPCell configuration, or any combination thereof, that may be used by the UE 115-*b* for communicating with the second serving cell 805-*b* as a PCell or an SCell.

At 830, the UE 115-*b* may activate the second serving cell 805-*b* as a PCell (e.g., PCell2) or an SCell, as indicated by the L2 control signaling. In this regard, the UE 115-*b* may activate the second serving cell 805-*b* based on receiving the L3 control signaling at 810, transmitting the RRC message at 815, transmitting the measurement report at 820, receiving the L2 control signaling at 825, or any combination thereof.

For example, in cases where the second serving cell 805-*b* is to be activated as a new PCell (e.g., PCell2), the second serving cell 805-*b* may transmit a message to the UE 115-*b*, where the message indicates an activation and/or completion of a handover procedure to the second serving cell 805-*b* (e.g., PCell update confirmation).

At 835, in cases where the second serving cell 805-*b* is activated as a new PCell, the UE 115-*b* and the first serving cell 805-*a* may deactivate the first serving cell 805-*a* at the UE 115-*b*. For example, in cases where the L2 control signaling activates the second serving cell 805-*b* as a new PCell, the L2 control signaling may also include an indication for the UE 115-*b* to deactivate the first serving cell 805-*a*. In this regard, the UE 115-*b* and the first serving cell 805-*a* may deactivate the first serving cell 805-*a* at the UE 115-*b* based on receiving/transmitting the L3 control signaling at 810, transmitting/receiving the RRC message at 815, transmitting/receiving the measurement report at 820, receiving/transmitting the L2 control signaling at 825, activating the second serving cell 805-*b* as a new PCell at 830, or any combination thereof.

At 840, the UE 115-*b* may communicate with the second serving cell 805-*b* as a PCell (e.g., PCell2) or an SCell, as indicated by the L2 control signaling. In particular, the UE 115-*b* may communicate with the second serving cell 805-*b* in accordance with a set of parameters indicated by the L3 control signaling at 810 and/or the L2 control signaling at 825.

Techniques described herein may enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

Figure 9:
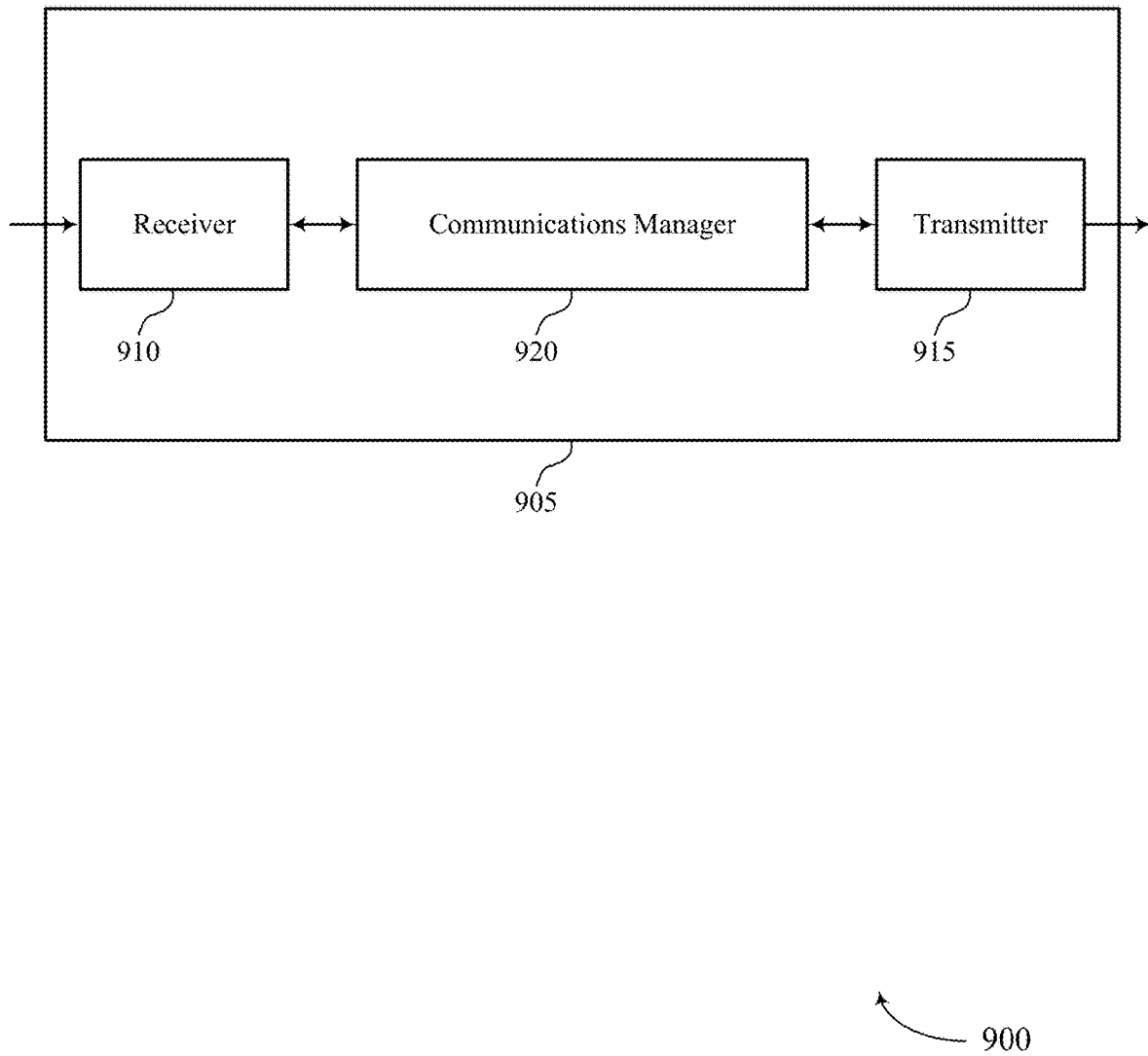
FIGS. 9 and 10 show block diagrams of devices that support techniques for L2 signaling for L1 and L2 mobility in accordance with one or more aspects of the present disclosure.

FIG. 9 shows a block diagram 900 of a device 905 that supports techniques for L2 signaling for L1 and L2 mobility in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for L2 signaling for L1 and L2 mobility). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for L2 signaling for L1 and L2 mobility). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for L2 signaling for L1 and L2 mobility as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving, from a first serving cell and via L3 control signaling, first signaling indicative of a set of multiple sets of parameters for primary serving cell or secondary serving cell operation. The communications manager 920 may be configured as or otherwise support a means for receiving, from the first serving cell and via L2 control signaling, second signaling indicating an activation of a second serving cell at the UE. The communications manager 920 may be configured as or otherwise support a means for receiving, via the second signaling, an indication that specifies that the second serving cell is to be activated as a primary serving cell. The communications manager 920 may be configured as or otherwise support a means for communicating with the second serving cell as the primary serving cell based on receiving the second signaling and in accordance with a set of parameters from the set of multiple sets of parameters indicated by the first signaling.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

Figure 10:
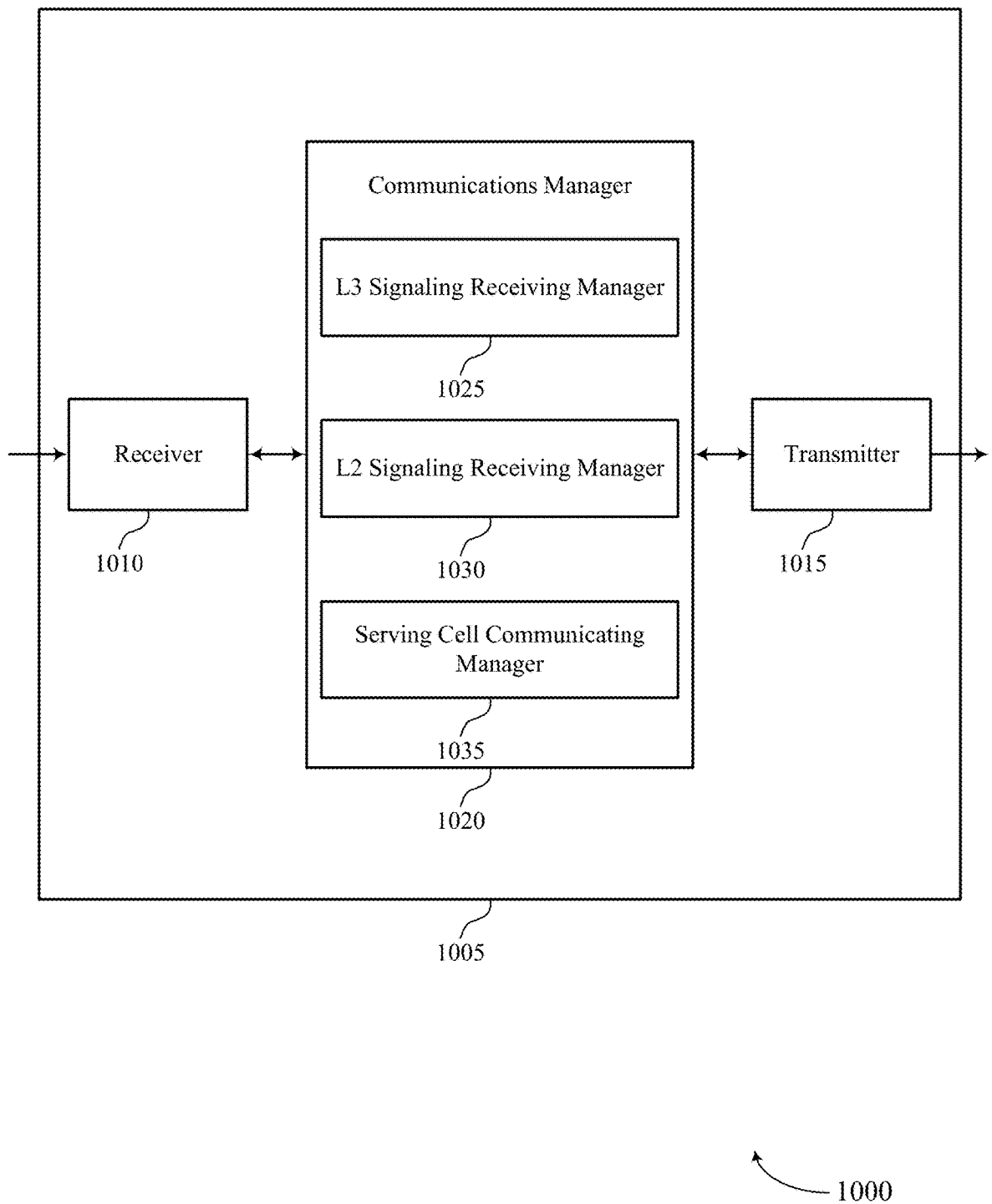

FIG. 10 shows a block diagram 1000 of a device 1005 that supports techniques for L2 signaling for L1 and L2 mobility in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for L2 signaling for L1 and L2 mobility). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for L2 signaling for L1 and L2 mobility). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for L2 signaling for L1 and L2 mobility as described herein. For example, the communications manager 1020 may include a L3 signaling receiving manager 1025, a L2 signaling receiving manager 1030, a serving cell communicating manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The L3 signaling receiving manager 1025 may be configured as or otherwise support a means for receiving, from a first serving cell and via L3 control signaling, first signaling indicative of a set of multiple sets of parameters for primary serving cell or secondary serving cell operation. The L2 signaling receiving manager 1030 may be configured as or otherwise support a means for receiving, from the first serving cell and via L2 control signaling, second signaling indicating an activation of a second serving cell at the UE. The L2 signaling receiving manager 1030 may be configured as or otherwise support a means for receiving, via the second signaling, an indication that specifies that the second serving cell is to be activated as a primary serving cell. The serving cell communicating manager 1035 may be configured as or otherwise support a means for communicating with the second serving cell as the primary serving cell based on receiving the second signaling and in accordance with a set of parameters from the set of multiple sets of parameters indicated by the first signaling.

Figure 11:
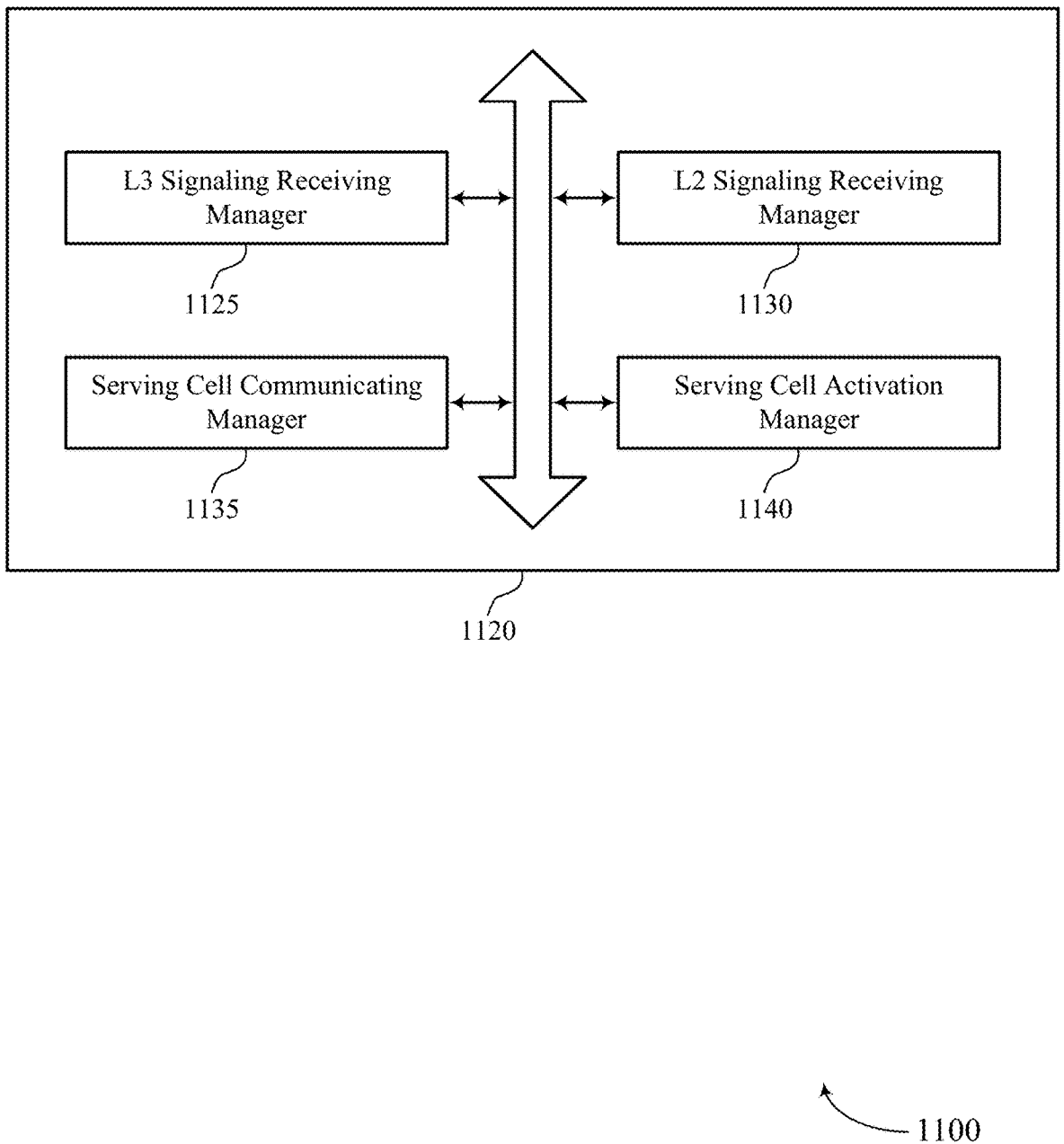
FIG. 11 shows a block diagram of a communications manager that supports techniques for L2 signaling for L1 and L2 mobility in accordance with one or more aspects of the present disclosure.

FIG. 11 shows a block diagram 1100 of a communications manager 1120 that supports techniques for L2 signaling for L1 and L2 mobility in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for L2 signaling for L1 and L2 mobility as described herein. For example, the communications manager 1120 may include a L3 signaling receiving manager 1125, a L2 signaling receiving manager 1130, a serving cell communicating manager 1135, a serving cell activation manager 1140, or any combination thereof. Each of these components may communicate, directly or indirectly, with one another (e.g., via one or more buses).

The communications manager 1120 may support wireless communication at a UE in accordance with examples as disclosed herein. The L3 signaling receiving manager 1125 may be configured as or otherwise support a means for receiving, from a first serving cell and via L3 control signaling, first signaling indicative of a set of multiple sets of parameters for primary serving cell or secondary serving cell operation. The L2 signaling receiving manager 1130 may be configured as or otherwise support a means for receiving, from the first serving cell and via L2 control signaling, second signaling indicating an activation of a second serving cell at the UE. In some examples, the L2 signaling receiving manager 1130 may be configured as or otherwise support a means for receiving, via the second signaling, an indication that specifies that the second serving cell is to be activated as a primary serving cell. The serving cell communicating manager 1135 may be configured as or otherwise support a means for communicating with the second serving cell as the primary serving cell based on receiving the second signaling and in accordance with a set of parameters from the set of multiple sets of parameters indicated by the first signaling.

In some examples, the L2 signaling receiving manager 1130 may be configured as or otherwise support a means for receiving, via the second signaling, a set of bit field values associated with the activation of the second serving cell, where one or more bit field values of the set of bit field values indicate the set of parameters associated with primary serving cell, where communicating with the second serving cell as the primary serving cell is based on receiving the one or more bit field values. In some examples, the one or more bit field values indicate a TRS ID corresponding to the set of parameters associated with the primary serving cell.

In some examples, the L2 signaling receiving manager 1130 may be configured as or otherwise support a means for receiving, via the second signaling, a first bit field value of the set of bit field values that includes the indication that specifies that the second serving cell is to be activated as the primary serving cell, where communicating with the second serving cell as the primary serving cell is based on receiving the first bit field value.

In some examples, the L2 signaling receiving manager 1130 may be configured as or otherwise support a means for receiving, via the second signaling based on the second serving cell being activated as the primary serving cell, a second set of bit field values indicating a second set of parameters associated with the primary serving cell, where communicating with the second serving cell as the primary serving cell is based on the second set of parameters.

In some examples, the set of bit field values indicate a TRS ID corresponding to the set of parameters associated with the primary serving cell. In some examples, the second set of bit field values indicate a SPCell configuration corresponding to the second set of parameters associated with the primary serving cell. In some examples, the set of bit field values includes a first octet of bit field values. In some examples, the second set of bit field values includes a second set of bit field values.

In some examples, a first subset of bit field values of the second set of bit field values indicate the second set of parameters associated with the primary serving cell. In some examples, a second subset of bit field values of the second set of bit field values indicate beam information associated with the primary serving cell. In some examples, communicating with the second serving cell as the primary serving cell is based on the beam information.

In some examples, the L2 signaling receiving manager 1130 may be configured as or otherwise support a means for receiving, via the second signaling based on the second serving cell being activated as the primary serving cell, a second set of bit field values including at least a first bit field value indicating a cell index associated with the second serving cell that specifies that the second serving cell is to be activated as the primary serving cell, and at least a second bit field value indicating a second set of parameters associated with the primary serving cell, where communicating with the second serving cell as the primary serving cell is based on receiving the second set of bit field values.

In some examples, the L2 signaling receiving manager 1130 may be configured as or otherwise support a means for receiving, via the second signaling based on the second serving cell being activated as the primary serving cell, a second set of bit field values indicating a cell index associated with the second serving cell that specifies that the second serving cell is to be activated as the primary serving cell. In some examples, the L2 signaling receiving manager 1130 may be configured as or otherwise support a means for receiving, via the second signaling based on the second serving cell being activated as the primary serving cell, a third set of bit field values indicating a second set of parameters associated with the primary serving cell, where communicating with the second serving cell as the primary serving cell is based on receiving the second set of bit field values and the third set of bit field values.

In some examples, the L2 signaling receiving manager 1130 may be configured as or otherwise support a means for receiving, via the second signaling, an activation of a third serving cell at the UE. In some examples, the L2 signaling receiving manager 1130 may be configured as or otherwise support a means for receiving, via the second signaling, an indication that specifies that the third serving cell is to be activated as a secondary serving cell. In some examples, the serving cell communicating manager 1135 may be configured as or otherwise support a means for communicating with the third serving cell as the secondary serving cell based on receiving the second signaling and in accordance with a second set of parameters from the set of multiple sets of parameters indicated by the first signaling.

In some examples, the first serving cell includes an additional primary serving cell, and the L2 signaling receiving manager 1130 may be configured as or otherwise support a means for receiving, via the second signaling, a deactivation of the additional primary serving cell. In some examples, the first serving cell includes an additional primary serving cell, and the serving cell activation manager 1140 may be configured as or otherwise support a means for deactivating the additional primary serving cell based on receiving the second signaling, where communicating with the second serving cell as the primary serving cell is based on deactivating the additional primary serving cell.

In some examples, the L2 signaling receiving manager 1130 may be configured as or otherwise support a means for receiving, via the second signaling, a bit field value that indicates the second signaling includes a message format that is associated with an activation, a deactivation, or both, of both primary serving cells and secondary serving cells, where receiving the indication that specifies that the second serving cell is to be activated as a primary serving cell is based on the second signaling including the message format.

In some examples, the second signaling is associated with a LCD indicating a message format that is associated with an activation, a deactivation, or both, of both primary serving cells and secondary serving cells. In some examples, the L3 control signaling includes RRC signaling. In some examples, the L2 control signaling includes MAC-CE signaling.

Figure 12:
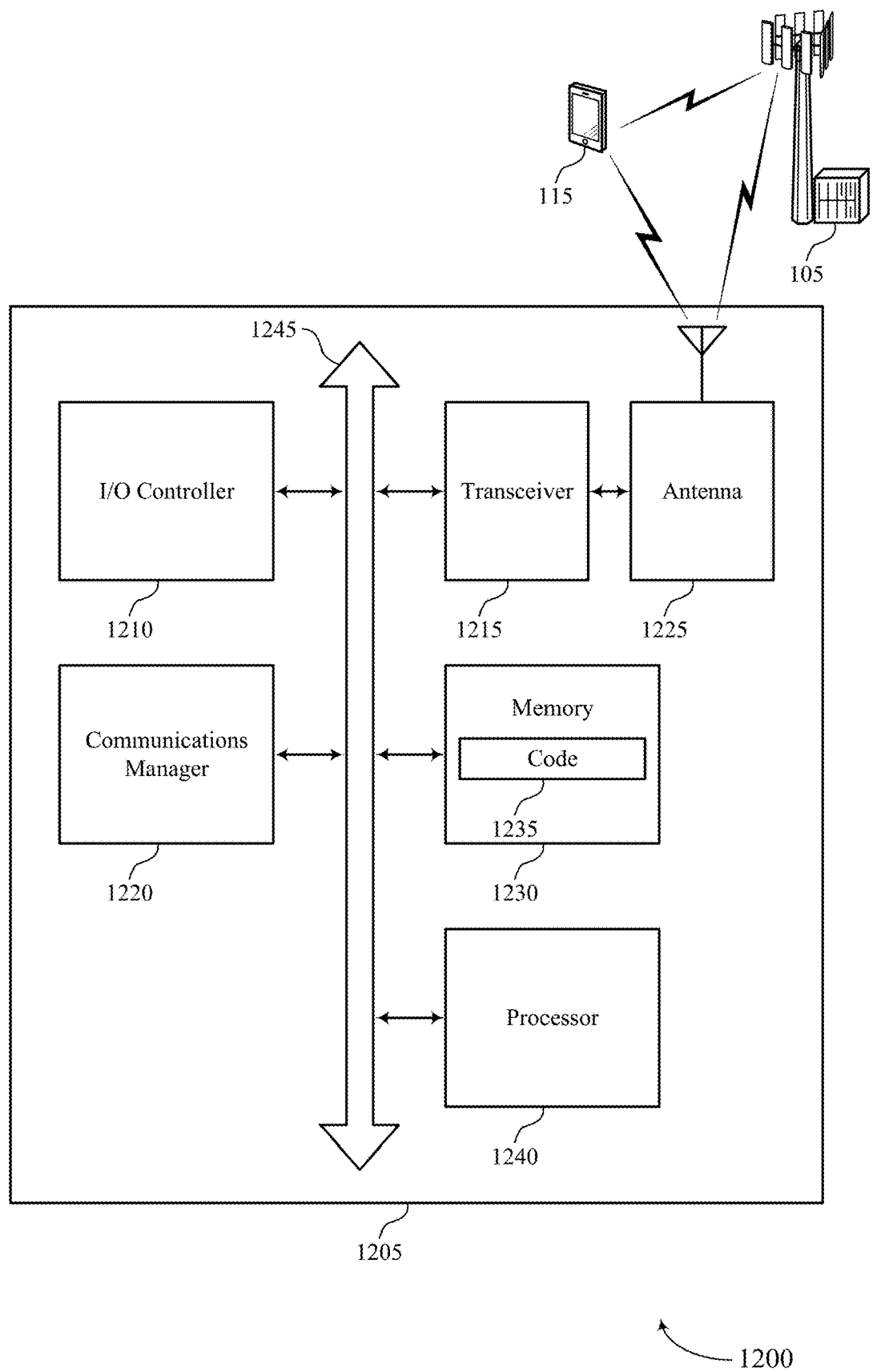
FIG. 12 shows a diagram of a system including a device that supports techniques for L2 signaling for L1 and L2 mobility in accordance with one or more aspects of the present disclosure.

FIG. 12 shows a diagram of a system 1200 including a device 1205 that supports techniques for L2 signaling for L1 and L2 mobility in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for L2 signaling for L1 and L2 mobility). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a first serving cell and via L3 control signaling, first signaling indicative of a set of multiple sets of parameters for primary serving cell or secondary serving cell operation. The communications manager 1220 may be configured as or otherwise support a means for receiving, from the first serving cell and via L2 control signaling, second signaling indicating an activation of a second serving cell at the UE. The communications manager 1220 may be configured as or otherwise support a means for receiving, via the second signaling, an indication that specifies that the second serving cell is to be activated as a primary serving cell. The communications manager 1220 may be configured as or otherwise support a means for communicating with the second serving cell as the primary serving cell based on receiving the second signaling and in accordance with a set of parameters from the set of multiple sets of parameters indicated by the first signaling.

By including or configuring the communications manager 1220 in accordance with examples as described herein, the device 1205 may support techniques that enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for L2 signaling for L1 and L2 mobility as described herein, or the processor 1240 and the memory 1230 may be otherwise configured to perform or support such operations.

Figure 13:
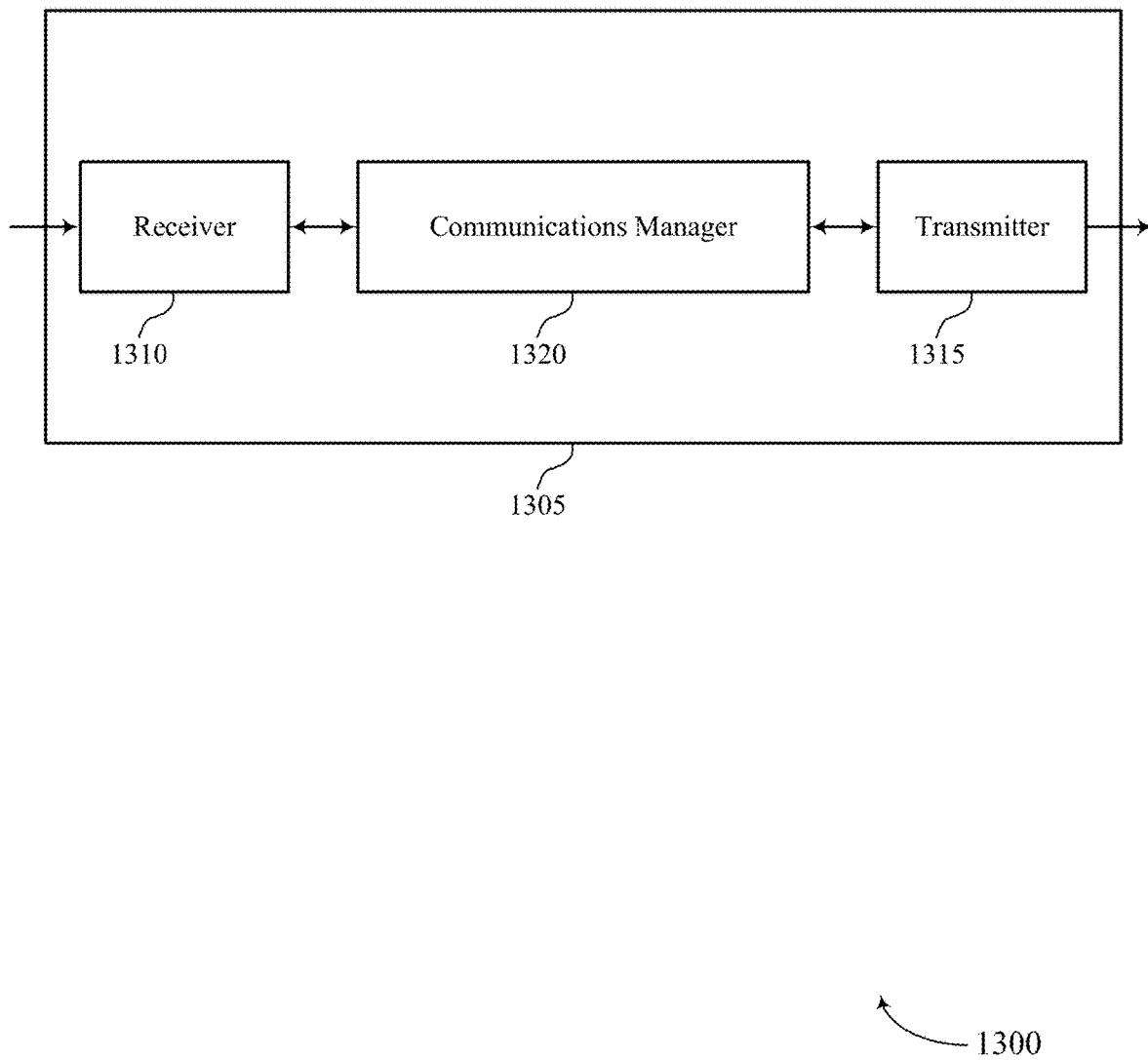
FIGS. 13 and 14 show block diagrams of devices that support techniques for L2 signaling for L1 and L2 mobility in accordance with one or more aspects of the present disclosure.

FIG. 13 shows a block diagram 1300 of a device 1305 that supports techniques for L2 signaling for L1 and L2 mobility in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for L2 signaling for L1 and L2 mobility as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. For example, the communications manager 1320 may be configured as or otherwise support a means for transmitting, to a UE using a first serving cell supported by the network entity and via L3 control signaling, first signaling indicative of a set of multiple sets of parameters for primary serving cell or secondary serving cell operation. The communications manager 1320 may be configured as or otherwise support a means for transmitting, to the UE using the first serving cell and via L2 control signaling, second signaling that activates a second serving cell at the UE. The communications manager 1320 may be configured as or otherwise support a means for transmitting, via the second signaling, an indication that specifies that the second serving cell is to be activated as a primary serving cell. The communications manager 1320 may be configured as or otherwise support a means for deactivating the first serving cell at the UE based on the second serving cell to be activated at the UE as the primary serving cell.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques that enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

Figure 14:
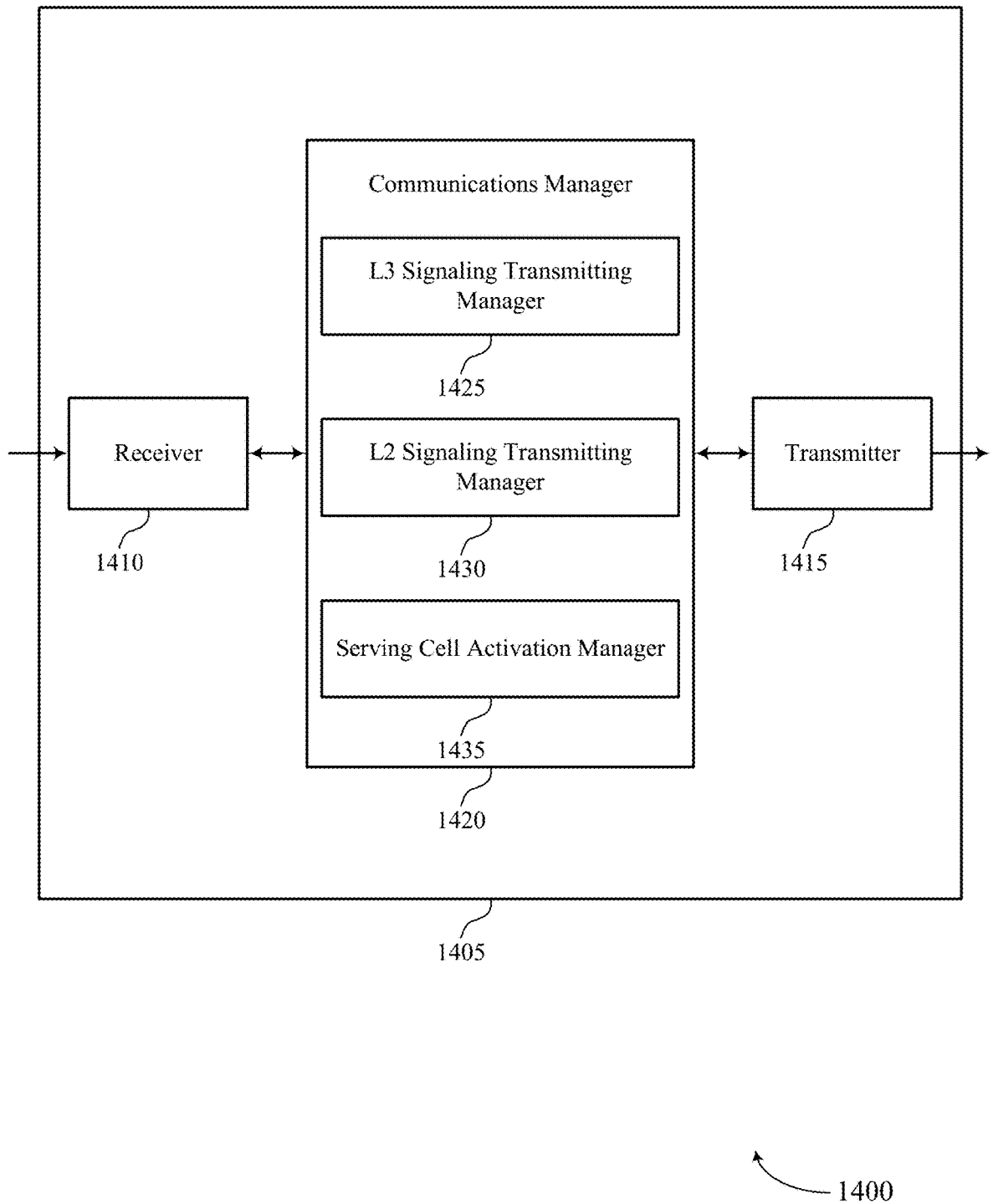

FIG. 14 shows a block diagram 1400 of a device 1405 that supports techniques for L2 signaling for L1 and L2 mobility in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for L2 signaling for L1 and L2 mobility as described herein. For example, the communications manager 1420 may include a L3 signaling transmitting manager 1425, a L2 signaling transmitting manager 1430, a serving cell activation manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. The L3 signaling transmitting manager 1425 may be configured as or otherwise support a means for transmitting, to a UE using a first serving cell supported by the network entity and via L3 control signaling, first signaling indicative of a set of multiple sets of parameters for primary serving cell or secondary serving cell operation. The L2 signaling transmitting manager 1430 may be configured as or otherwise support a means for transmitting, to the UE using the first serving cell and via L2 control signaling, second signaling that activates a second serving cell at the UE. The L2 signaling transmitting manager 1430 may be configured as or otherwise support a means for transmitting, via the second signaling, an indication that specifies that the second serving cell is to be activated as a primary serving cell. The serving cell activation manager 1435 may be configured as or otherwise support a means for deactivating the first serving cell at the UE based on the second serving cell to be activated at the UE as the primary serving cell.

Figure 15:
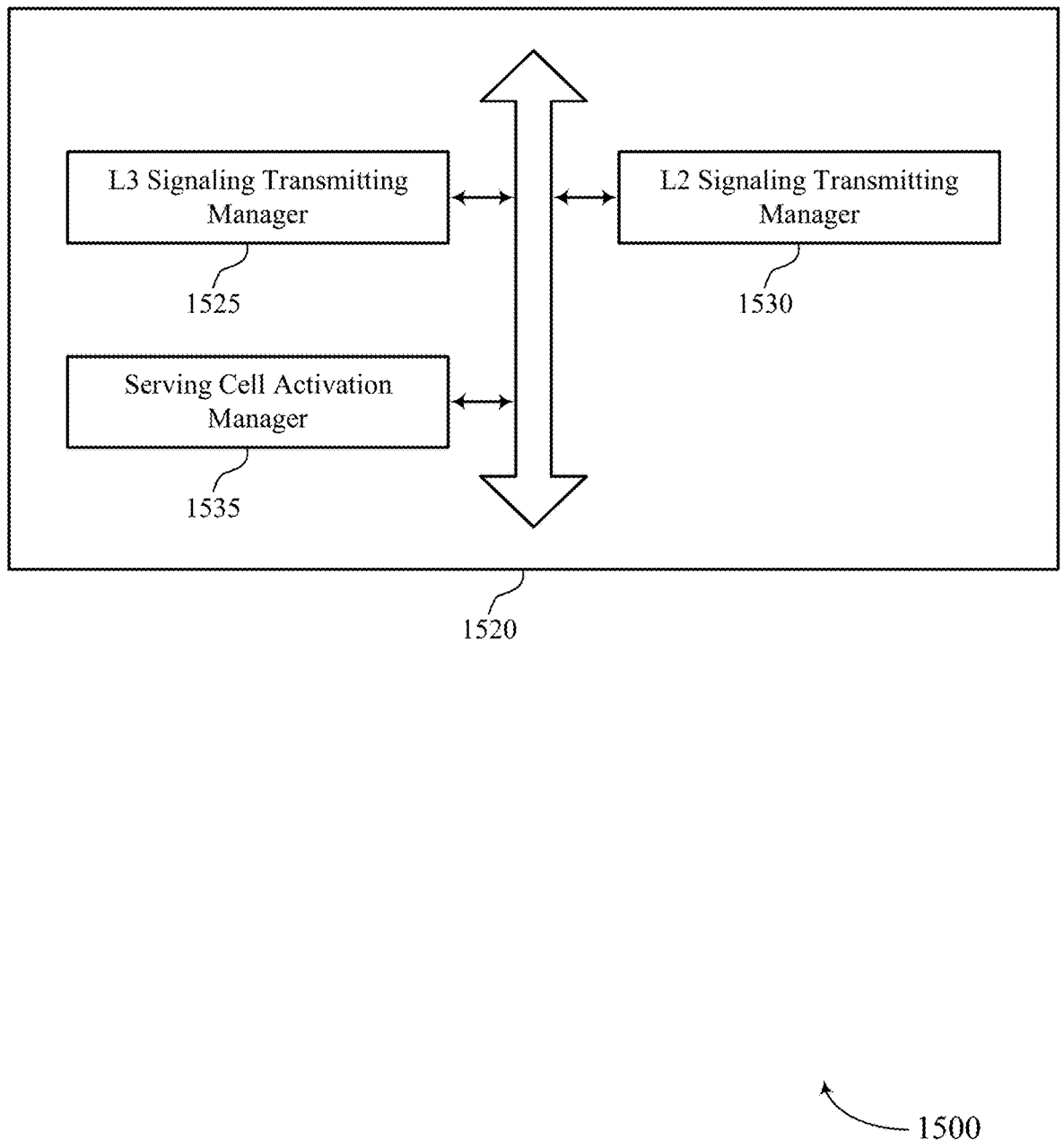
FIG. 15 shows a block diagram of a communications manager that supports techniques for L2 signaling for L1 and L2 mobility in accordance with one or more aspects of the present disclosure.

FIG. 15 shows a block diagram 1500 of a communications manager 1520 that supports techniques for L2 signaling for L1 and L2 mobility in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for L2 signaling for L1 and L2 mobility as described herein. For example, the communications manager 1520 may include a L3 signaling transmitting manager 1525, a L2 signaling transmitting manager 1530, a serving cell activation manager 1535, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The L3 signaling transmitting manager 1525 may be configured as or otherwise support a means for transmitting, to a UE using a first serving cell supported by the network entity and via L3 control signaling, first signaling indicative of a set of multiple sets of parameters for primary serving cell or secondary serving cell operation. The L2 signaling transmitting manager 1530 may be configured as or otherwise support a means for transmitting, to the UE using the first serving cell and via L2 control signaling, second signaling that activates a second serving cell at the UE. In some examples, the L2 signaling transmitting manager 1530 may be configured as or otherwise support a means for transmitting, via the second signaling, an indication that specifies that the second serving cell is to be activated as a primary serving cell. The serving cell activation manager 1535 may be configured as or otherwise support a means for deactivating the first serving cell at the UE based on the second serving cell to be activated at the UE as the primary serving cell.

In some examples, the L2 signaling transmitting manager 1530 may be configured as or otherwise support a means for transmitting, via the second signaling, a set of bit field values associated with the activation of the second serving cell, where one or more bit field values of the set of bit field values indicate the set of parameters associated with primary serving cell, where deactivating the first serving cell is based on transmitting the one or more bit field values. In some examples, the one or more bit field values indicate a TRS ID corresponding to the set of parameters associated with the primary serving cell.

In some examples, the L2 signaling transmitting manager 1530 may be configured as or otherwise support a means for transmitting, via the second signaling, a first bit field value of the set of bit field values that includes the indication that specifies that the second serving cell is to be activated as the primary serving cell, where deactivating the first serving cell is based on transmitting the first bit field value.

In some examples, the L2 signaling transmitting manager 1530 may be configured as or otherwise support a means for transmitting, via the second signaling based on the second serving cell being activated as the primary serving cell, a second set of bit field values indicating a second set of parameters associated with the primary serving cell.

In some examples, the set of bit field values indicate a TRS ID corresponding to the set of parameters associated with the primary serving cell. In some examples, the second set of bit field values indicate a SPCell configuration corresponding to the second set of parameters associated with the primary serving cell. In some examples, the set of bit field values includes a first octet of bit field values. In some examples, the second set of bit field values includes a second set of bit field values.

In some examples, a first subset of bit field values of the second set of bit field values indicate the second set of parameters associated with the primary serving cell. In some examples, a second subset of bit field values of the second set of bit field values indicate beam information associated with the primary serving cell.

In some examples, the L2 signaling transmitting manager 1530 may be configured as or otherwise support a means for transmitting, via the second signaling based on the second serving cell being activated as the primary serving cell, a second set of bit field values including at least a first bit field value including the indication that specifies that the second serving cell is to be activated as the primary serving cell, and at least a second bit field value indicating a second set of parameters associated with the primary serving cell.

In some examples, the L2 signaling transmitting manager 1530 may be configured as or otherwise support a means for transmitting, via the second signaling based on the second serving cell being activated as the primary serving cell, a second set of bit field values including the indication that specifies that the second serving cell is to be activated as the primary serving cell. In some examples, the L2 signaling transmitting manager 1530 may be configured as or otherwise support a means for transmitting, via the second signaling based on the second serving cell being activated as the primary serving cell, a third set of bit field values indicating a second set of parameters associated with the primary serving cell.

In some examples, the L2 signaling transmitting manager 1530 may be configured as or otherwise support a means for transmitting, via the second signaling, an activation of a third serving cell at the UE. In some examples, the L2 signaling transmitting manager 1530 may be configured as or otherwise support a means for transmitting, via the second signaling, an indication that specifies that the third serving cell is to be activated as a secondary serving cell.

In some examples, the first serving cell includes an additional primary serving cell, and the L2 signaling transmitting manager 1530 may be configured as or otherwise support a means for transmitting, via the second signaling, a deactivation of the additional primary serving cell, where deactivating the first serving cell is based on transmitting the second signaling.

In some examples, the L2 signaling transmitting manager 1530 may be configured as or otherwise support a means for transmitting, via the second signaling, a bit field value that indicates the second signaling includes a message format that is associated with an activation, a deactivation, or both, of both primary serving cells and secondary serving cells, where transmitting the indication that specifies that the second serving cell is to be activated as a primary serving cell is based on the second signaling including the message format.

In some examples, the second signaling is associated with a LCD indicating a message format that is associated with an activation, a deactivation, or both, of both primary serving cells and secondary serving cells. In some examples, the L3 control signaling includes RRC signaling. In some examples, the L2 control signaling includes MAC-CE signaling.

Figure 16:
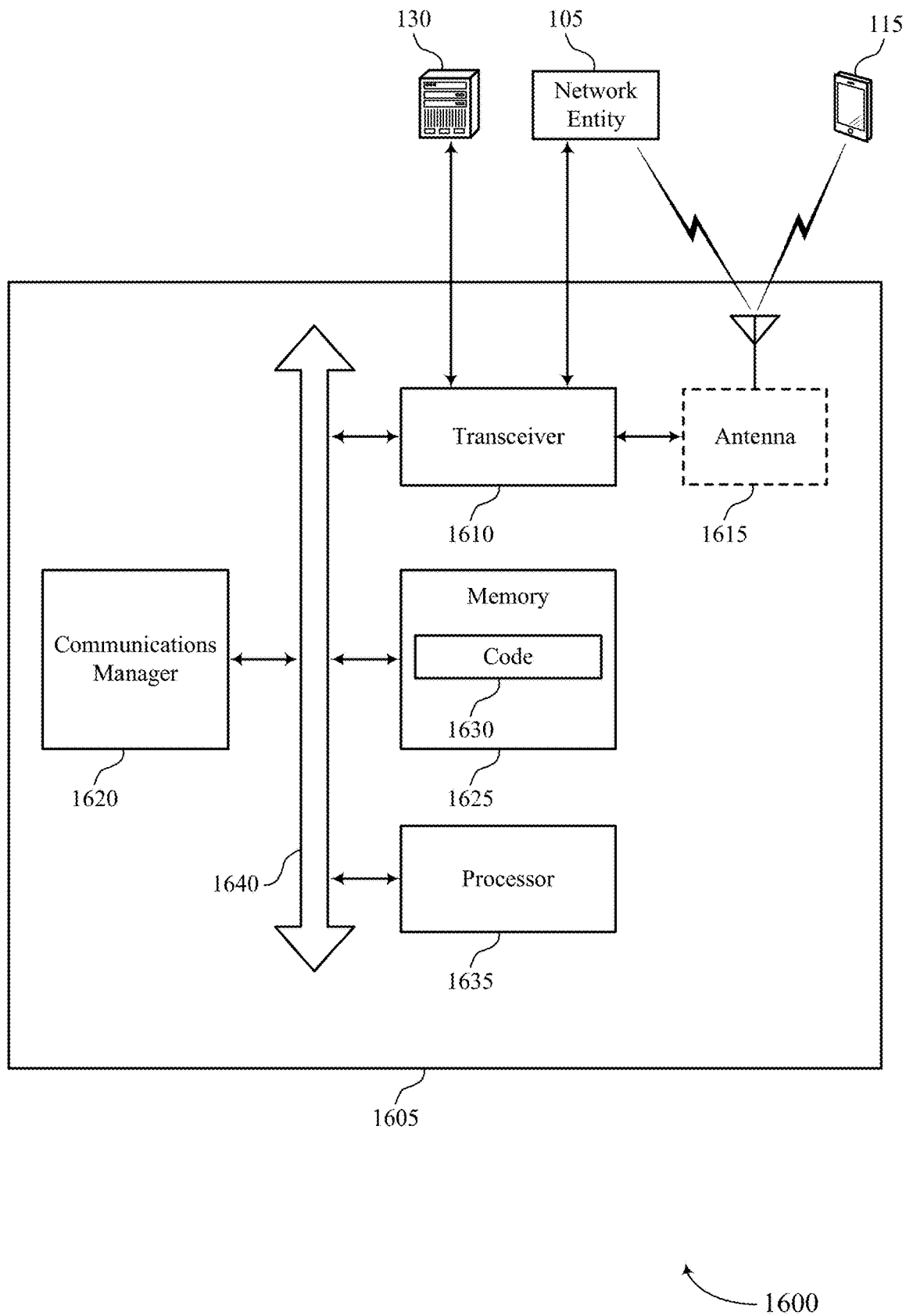
FIG. 16 shows a diagram of a system including a device that supports techniques for L2 signaling for L1 and L2 mobility in accordance with one or more aspects of the present disclosure.

FIG. 16 shows a diagram of a system 1600 including a device 1605 that supports techniques for L2 signaling for L1 and L2 mobility in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting techniques for L2 signaling for L1 and L2 mobility). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1605 may transmit information output from the chip or modem. In some implementations, the second interface may refer to an interface between the processing system of the chip or modem and a receiver, such that the device 1605 may obtain information or signal inputs, and the information may be passed to the processing system. A person having ordinary skill in the art will readily recognize that the first interface also may obtain information or signal inputs, and the second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for transmitting, to a UE using a first serving cell supported by the network entity and via L3 control signaling, first signaling indicative of a set of multiple sets of parameters for primary serving cell or secondary serving cell operation. The communications manager 1620 may be configured as or otherwise support a means for transmitting, to the UE using the first serving cell and via L2 control signaling, second signaling that activates a second serving cell at the UE. The communications manager 1620 may be configured as or otherwise support a means for transmitting, via the second signaling, an indication that specifies that the second serving cell is to be activated as a primary serving cell. The communications manager 1620 may be configured as or otherwise support a means for deactivating the first serving cell at the UE based on the second serving cell to be activated at the UE as the primary serving cell.

By including or configuring the communications manager 1620 in accordance with examples as described herein, the device 1605 may support techniques that enable handover procedures between PCells to be triggered using L2 signaling. In particular, aspects of the present disclosure may enable RRC parameters for different serving cells to be configured via L3 signaling (e.g., L3 signaling), where handover procedures between the respective cells is triggered via L2 signaling. By enabling handover procedures to be performed/triggered via L2 signaling, techniques described herein may improve the speed and efficiency with which handover procedures are performed. As such, aspects of the present disclosure may reduce a latency of handover procedures, reduce interruptions of wireless communications caused by handover procedures, and improve overall user experience.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of techniques for L2 signaling for L1 and L2 mobility as described herein, or the processor 1635 and the memory 1625 may be otherwise configured to perform or support such operations.

Figure 17:
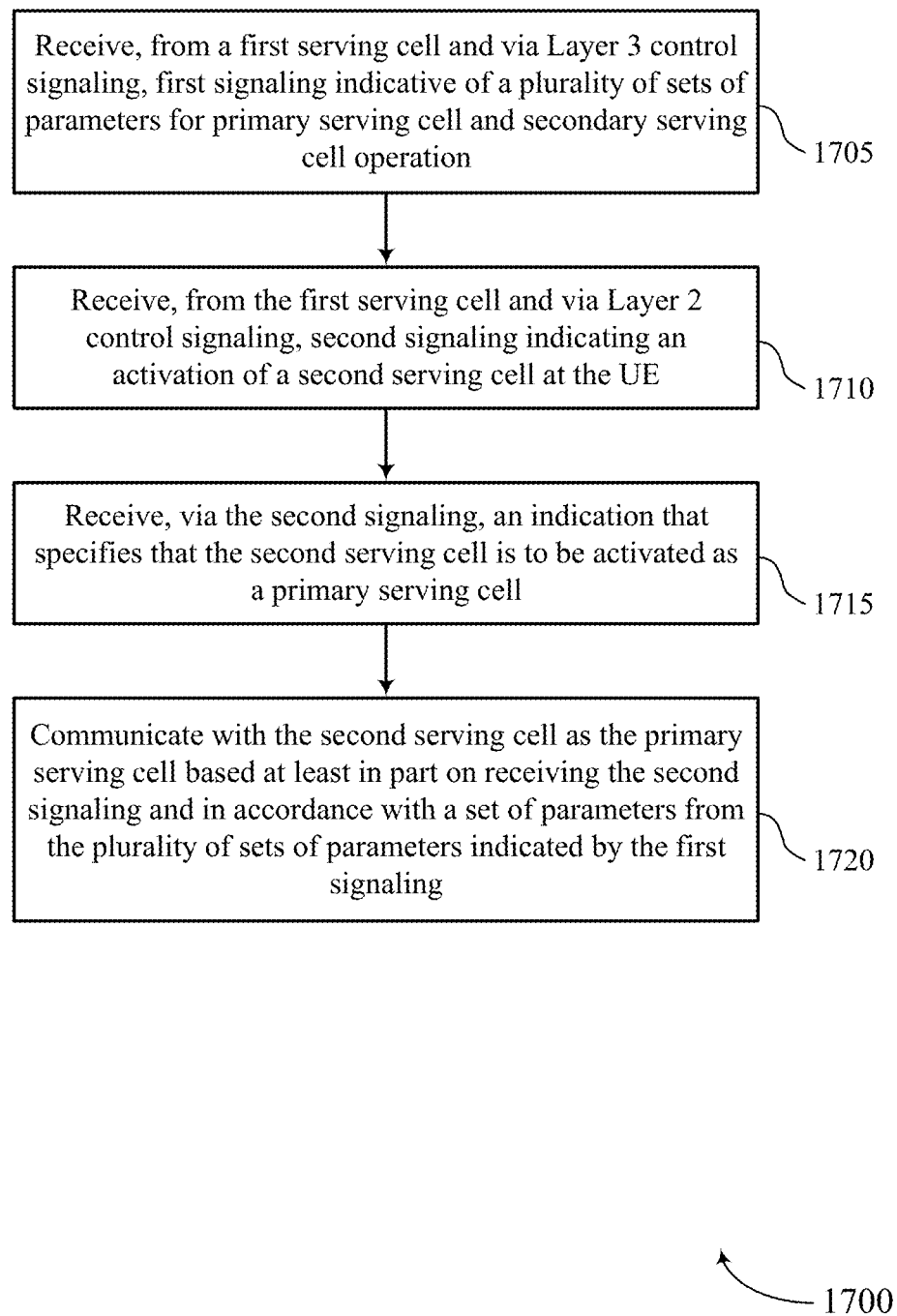
FIGS. 17 through 20 show flowcharts illustrating methods that support techniques for L2 signaling for L1 and L2 mobility in accordance with one or more aspects of the present disclosure.

FIG. 17 shows a flowchart illustrating a method 1700 that supports techniques for L2 signaling for L1 and L2 mobility in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a first serving cell and via L3 control signaling, first signaling indicative of a set of multiple sets of parameters for primary serving cell and secondary serving cell operation. The operations of 1705 may be performed in accordance with examples as disclosed herein. In some examples, aspects of the operations of 1705 may be performed by a L3 signaling receiving manager 1125 as described with reference to FIG. 11.

At 1710, the method may include receiving, from the first serving cell and via L2 control signaling, second signaling indicating an activation of a second serving cell at the UE. The operations of 1710 may be performed in accordance with examples as disclosed herein. In some examples, aspects of the operations of 1710 may be performed by a L2 signaling receiving manager 1130 as described with reference to FIG. 11.

At 1715, the method may include receiving, via the second signaling, an indication that specifies that the second serving cell is to be activated as a primary serving cell. The operations of 1715 may be performed in accordance with examples as disclosed herein. In some examples, aspects of the operations of 1715 may be performed by a L2 signaling receiving manager 1130 as described with reference to FIG. 11.

At 1720, the method may include communicating with the second serving cell as the primary serving cell based on receiving the second signaling and in accordance with a set of parameters from the set of multiple sets of parameters indicated by the first signaling. The operations of 1720 may be performed in accordance with examples as disclosed herein. In some examples, aspects of the operations of 1720 may be performed by a serving cell communicating manager 1135 as described with reference to FIG. 11.

Figure 18:
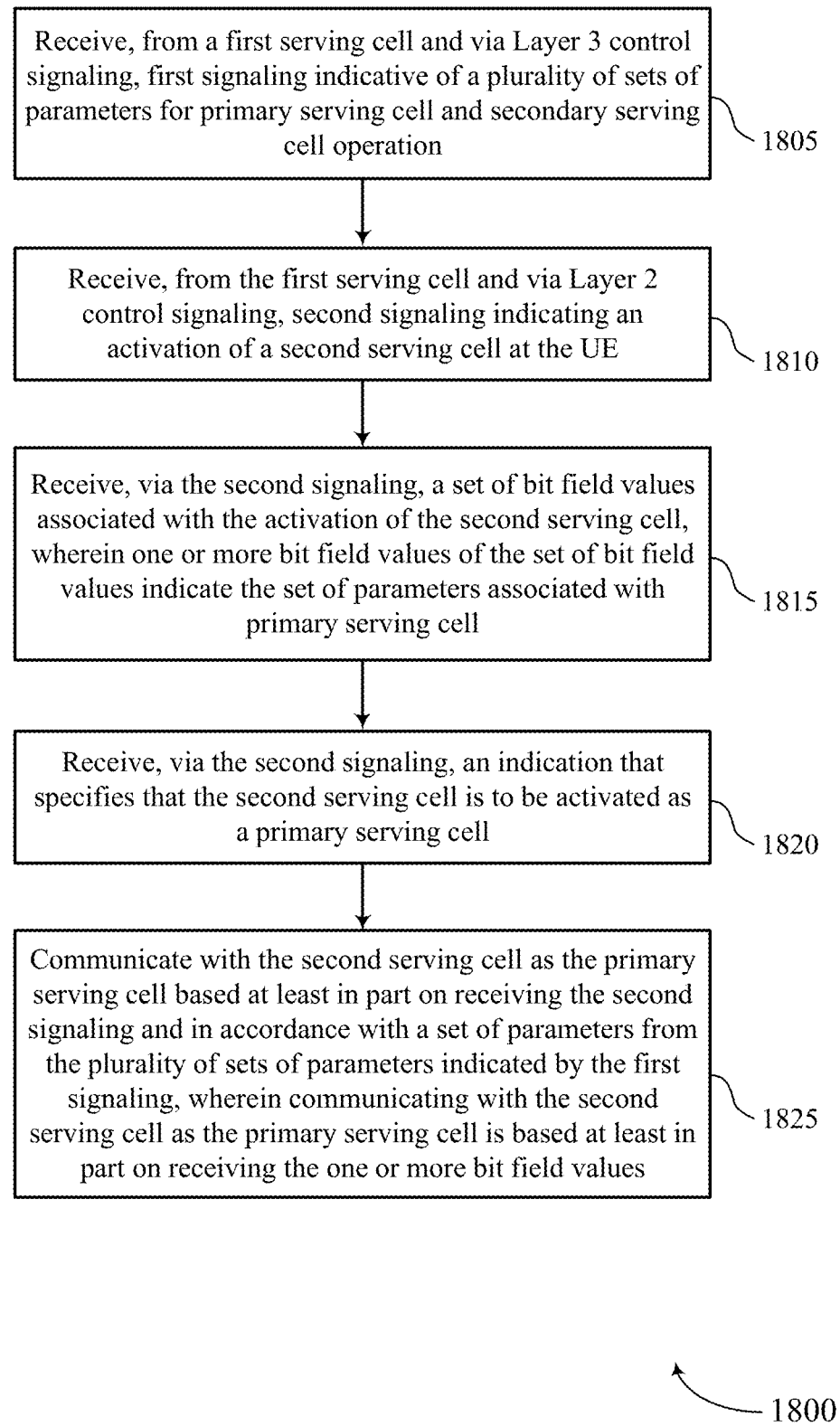

FIG. 18 shows a flowchart illustrating a method 1800 that supports techniques for L2 signaling for L1 and L2 mobility in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a first serving cell and via L3 control signaling, first signaling indicative of a set of multiple sets of parameters for primary serving cell and secondary serving cell operation. The operations of 1805 may be performed in accordance with examples as disclosed herein. In some examples, aspects of the operations of 1805 may be performed by a L3 signaling receiving manager 1125 as described with reference to FIG. 11.

At 1810, the method may include receiving, from the first serving cell and via L2 control signaling, second signaling indicating an activation of a second serving cell at the UE. The operations of 1810 may be performed in accordance with examples as disclosed herein. In some examples, aspects of the operations of 1810 may be performed by a L2 signaling receiving manager 1130 as described with reference to FIG. 11.

At 1815, the method may include receiving, via the second signaling, a set of bit field values associated with the activation of the second serving cell, where one or more bit field values of the set of bit field values indicate the set of parameters associated with primary serving cell. The operations of 1815 may be performed in accordance with examples as disclosed herein. In some examples, aspects of the operations of 1815 may be performed by a L2 signaling receiving manager 1130 as described with reference to FIG. 11.

At 1820, the method may include receiving, via the second signaling, an indication that specifies that the second serving cell is to be activated as a primary serving cell. The operations of 1820 may be performed in accordance with examples as disclosed herein. In some examples, aspects of the operations of 1820 may be performed by a L2 signaling receiving manager 1130 as described with reference to FIG. 11.

At 1825, the method may include communicating with the second serving cell as the primary serving cell based on receiving the second signaling and in accordance with a set of parameters from the set of multiple sets of parameters indicated by the first signaling, where communicating with the second serving cell as the primary serving cell is based on receiving the one or more bit field values. The operations of 1825 may be performed in accordance with examples as disclosed herein. In some examples, aspects of the operations of 1825 may be performed by a serving cell communicating manager 1135 as described with reference to FIG. 11.

Figure 19:
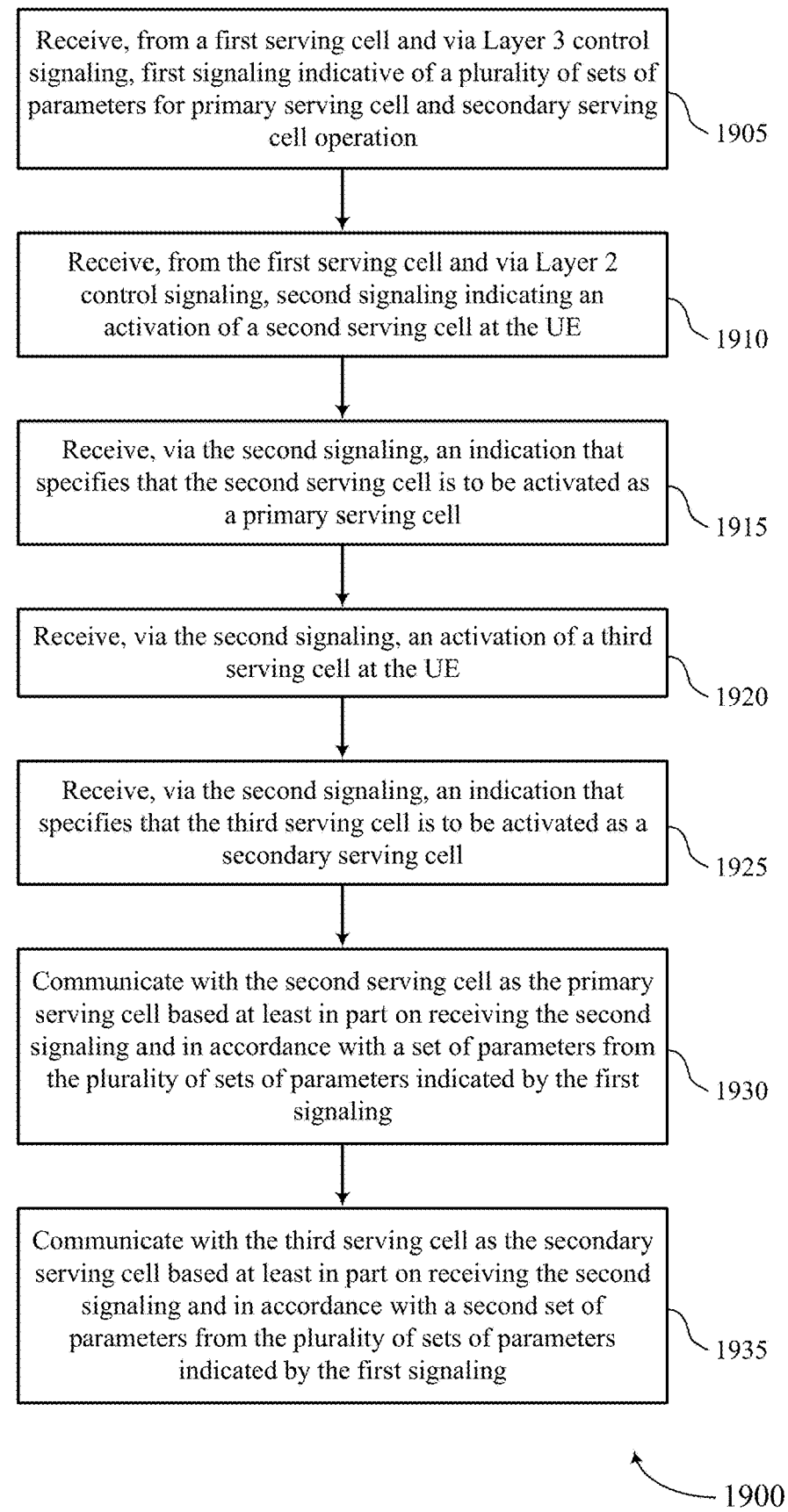

FIG. 19 shows a flowchart illustrating a method 1900 that supports techniques for L2 signaling for L1 and L2 mobility in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving, from a first serving cell and via L3 control signaling, first signaling indicative of a set of multiple sets of parameters for primary serving cell and secondary serving cell operation. The operations of 1905 may be performed in accordance with examples as disclosed herein. In some examples, aspects of the operations of 1905 may be performed by a L3 signaling receiving manager 1125 as described with reference to FIG. 11.

At 1910, the method may include receiving, from the first serving cell and via L2 control signaling, second signaling indicating an activation of a second serving cell at the UE. The operations of 1910 may be performed in accordance with examples as disclosed herein. In some examples, aspects of the operations of 1910 may be performed by a L2 signaling receiving manager 1130 as described with reference to FIG. 11.

At 1915, the method may include receiving, via the second signaling, an indication that specifies that the second serving cell is to be activated as a primary serving cell. The operations of 1915 may be performed in accordance with examples as disclosed herein. In some examples, aspects of the operations of 1915 may be performed by a L2 signaling receiving manager 1130 as described with reference to FIG. 11.

At 1920, the method may include receiving, via the second signaling, an activation of a third serving cell at the UE. The operations of 1920 may be performed in accordance with examples as disclosed herein. In some examples, aspects of the operations of 1920 may be performed by a L2 signaling receiving manager 1130 as described with reference to FIG. 11.

At 1925, the method may include receiving, via the second signaling, an indication that specifies that the third serving cell is to be activated as a secondary serving cell. The operations of 1925 may be performed in accordance with examples as disclosed herein. In some examples, aspects of the operations of 1925 may be performed by a L2 signaling receiving manager 1130 as described with reference to FIG. 11.

At 1930, the method may include communicating with the second serving cell as the primary serving cell based on receiving the second signaling and in accordance with a set of parameters from the set of multiple sets of parameters indicated by the first signaling. The operations of 1930 may be performed in accordance with examples as disclosed herein. In some examples, aspects of the operations of 1930 may be performed by a serving cell communicating manager 1135 as described with reference to FIG. 11.

At 1935, the method may include communicating with the third serving cell as the secondary serving cell based on receiving the second signaling and in accordance with a second set of parameters from the set of multiple sets of parameters indicated by the first signaling. The operations of 1935 may be performed in accordance with examples as disclosed herein. In some examples, aspects of the operations of 1935 may be performed by a serving cell communicating manager 1135 as described with reference to FIG. 11.

Figure 20:
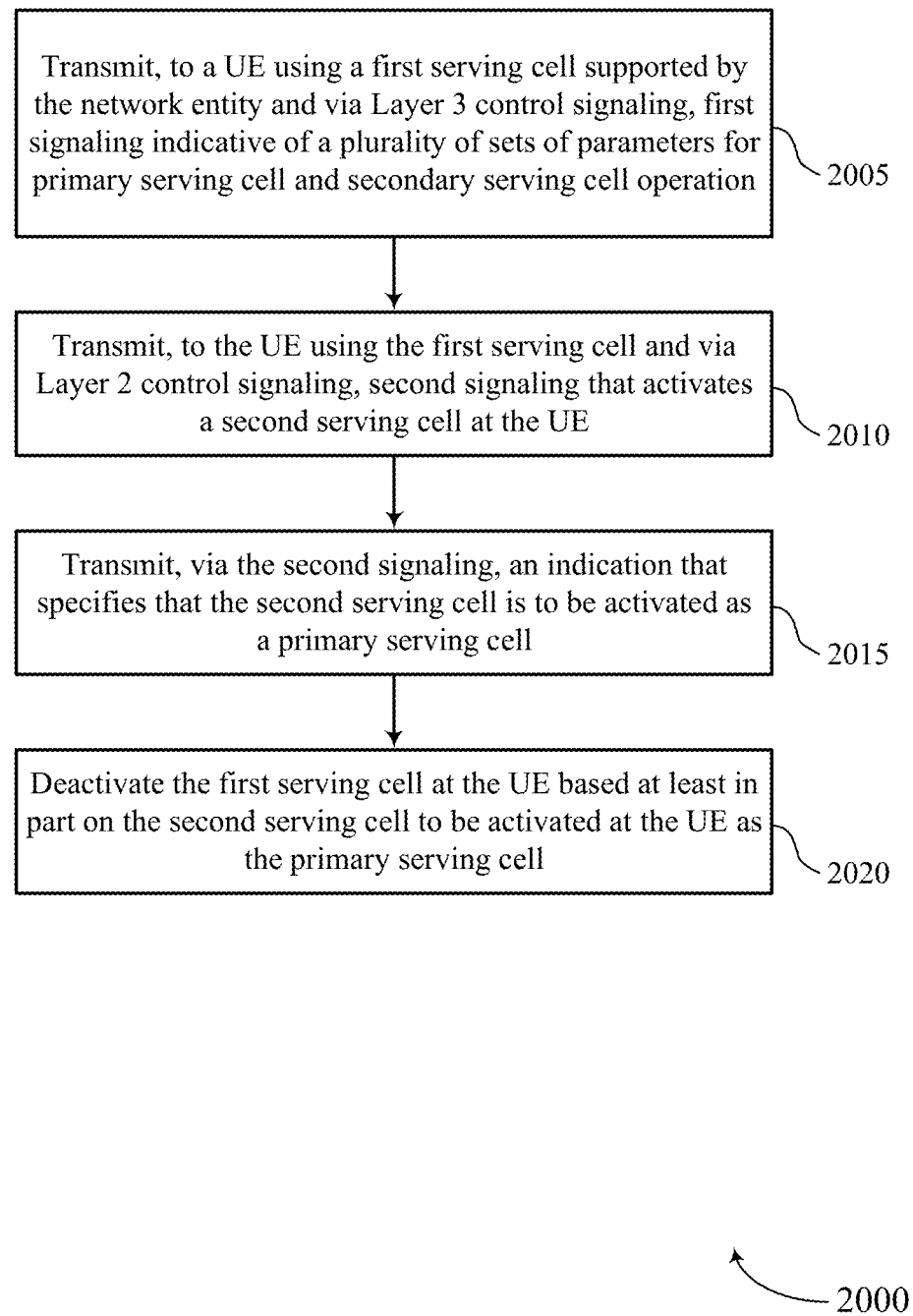

FIG. 20 shows a flowchart illustrating a method 2000 that supports techniques for L2 signaling for L1 and L2 mobility in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE using a first serving cell supported by the network entity and via L3 control signaling, first signaling indicative of a set of multiple sets of parameters for primary serving cell and secondary serving cell operation. The operations of 2005 may be performed in accordance with examples as disclosed herein. In some examples, aspects of the operations of 2005 may be performed by a L3 signaling transmitting manager 1525 as described with reference to FIG. 15.

At 2010, the method may include transmitting, to the UE using the first serving cell and via L2 control signaling, second signaling that activates a second serving cell at the UE. The operations of 2010 may be performed in accordance with examples as disclosed herein. In some examples, aspects of the operations of 2010 may be performed by a L2 signaling transmitting manager 1530 as described with reference to FIG. 15.

At 2015, the method may include transmitting, via the second signaling, an indication that specifies that the second serving cell is to be activated as a primary serving cell. The operations of 2015 may be performed in accordance with examples as disclosed herein. In some examples, aspects of the operations of 2015 may be performed by a L2 signaling transmitting manager 1530 as described with reference to FIG. 15.

At 2020, the method may include deactivating the first serving cell at the UE based on the second serving cell to be activated at the UE as the primary serving cell. The operations of 2020 may be performed in accordance with examples as disclosed herein. In some examples, aspects of the operations of 2020 may be performed by a serving cell activation manager 1535 as described with reference to FIG. 15.

The following provides an overview of aspects of the present disclosure:

Aspect 1: A method for wireless communication at a UE, comprising: receiving, from a first serving cell and via L3 control signaling, first signaling indicative of a plurality of sets of parameters for primary serving cell or secondary serving cell operation; receiving, from the first serving cell and via L2 control signaling, second signaling indicating an activation of a second serving cell at the UE; receiving, via the second signaling, an indication that specifies that the second serving cell is to be activated as a primary serving cell; and communicating with the second serving cell as the primary serving cell based at least in part on receiving the second signaling and in accordance with a set of parameters from the plurality of sets of parameters indicated by the first signaling.

Aspect 2: The method of aspect 1, further comprising: receiving, via the second signaling, a set of bit field values associated with the activation of the second serving cell, wherein one or more bit field values of the set of bit field values indicate the set of parameters associated with primary serving cell, wherein communicating with the second serving cell as the primary serving cell is based at least in part on receiving the one or more bit field values.

Aspect 3: The method of aspect 2, wherein the one or more bit field values indicate a TRS ID corresponding to the set of parameters associated with the primary serving cell.

Aspect 4: The method of any of aspects 2 through 3, further comprising: receiving, via the second signaling, a first bit field value of the set of bit field values that comprises the indication that specifies that the second serving cell is to be activated as the primary serving cell, wherein communicating with the second serving cell as the primary serving cell is based at least in part on receiving the first bit field value.

Aspect 5: The method of aspect 4, further comprising: receiving, via the second signaling based at least in part on the second serving cell being activated as the primary serving cell, a second set of bit field values indicating a second set of parameters associated with the primary serving cell, wherein communicating with the second serving cell as the primary serving cell is based at least in part on the second set of parameters.

Aspect 6: The method of aspect 5, wherein the set of bit field values indicate a TRS ID corresponding to the set of parameters associated with the primary serving cell, and the second set of bit field values indicate a special cell configuration corresponding to the second set of parameters associated with the primary serving cell.

Aspect 7: The method of any of aspects 5 through 6, wherein the set of bit field values comprises a first octet of bit field values, and the second set of bit field values comprises a second set of bit field values.

Aspect 8: The method of any of aspects 5 through 7, wherein a first subset of bit field values of the second set of bit field values indicate the second set of parameters associated with the primary serving cell, and a second subset of bit field values of the second set of bit field values indicate beam information associated with the primary serving cell, communicating with the second serving cell as the primary serving cell is based at least in part on the beam information.

Aspect 9: The method of any of aspects 2 through 8, further comprising: receiving, via the second signaling based at least in part on the second serving cell being activated as the primary serving cell, a second set of bit field values comprising at least a first bit field value indicating a cell index associated with the second serving cell that specifies that the second serving cell is to be activated as the primary serving cell, and at least a second bit field value indicating a second set of parameters associated with the primary serving cell, wherein communicating with the second serving cell as the primary serving cell is based at least in part on receiving the second set of bit field values.

Aspect 10: The method of any of aspects 2 through 9, further comprising: receiving, via the second signaling based at least in part on the second serving cell being activated as the primary serving cell, a second set of bit field values indicating a cell index associated with the second serving cell that specifies that the second serving cell is to be activated as the primary serving cell; and receiving, via the second signaling based at least in part on the second serving cell being activated as the primary serving cell, a third set of bit field values indicating a second set of parameters associated with the primary serving cell, wherein communicating with the second serving cell as the primary serving cell is based at least in part on receiving the second set of bit field values and the third set of bit field values.

Aspect 11: The method of any of aspects 1 through 10, further comprising: receiving, via the second signaling, an activation of a third serving cell at the UE; receiving, via the second signaling, an indication that specifies that the third serving cell is to be activated as a secondary serving cell; and communicating with the third serving cell as the secondary serving cell based at least in part on receiving the second signaling and in accordance with a second set of parameters from the plurality of sets of parameters indicated by the first signaling.

Aspect 12: The method of any of aspects 1 through 11, wherein the first serving cell comprises an additional primary serving cell, the method further comprising: receiving, via the second signaling, a deactivation of the additional primary serving cell; and deactivating the additional primary serving cell based at least in part on receiving the second signaling, wherein communicating with the second serving cell as the primary serving cell is based at least in part on deactivating the additional primary serving cell.

Aspect 13: The method of any of aspects 1 through 12, further comprising: receiving, via the second signaling, a bit field value that indicates the second signaling comprises a message format that is associated with an activation, a deactivation, or both, of both primary serving cells and secondary serving cells, wherein receiving the indication that specifies that the second serving cell is to be activated as a primary serving cell is based at least in part on the second signaling comprising the message format.

Aspect 14: The method of any of aspects 1 through 13, wherein the second signaling is associated with a LCD indicating a message format that is associated with an activation, a deactivation, or both, of both primary serving cells and secondary serving cells.

Aspect 15: The method of any of aspects 1 through 14, wherein the L3 control signaling comprises RRC signaling, and the L2 control signaling comprises MAC-CE signaling.

Aspect 16: A method for wireless communication at a network entity, comprising: transmitting, to a UE using a first serving cell supported by the network entity and via L3 control signaling, first signaling indicative of a plurality of sets of parameters for primary serving cell or secondary serving cell operation; transmitting, to the UE using the first serving cell and via L2 control signaling, second signaling that activates a second serving cell at the UE; transmitting, via the second signaling, an indication that specifies that the second serving cell is to be activated as a primary serving cell; and deactivating the first serving cell at the UE based at least in part on the second serving cell to be activated at the UE as the primary serving cell.

Aspect 17: The method of aspect 16, further comprising: transmitting, via the second signaling, a set of bit field values associated with the activation of the second serving cell, wherein one or more bit field values of the set of bit field values indicate the set of parameters associated with primary serving cell, wherein deactivating the first serving cell is based at least in part on transmitting the one or more bit field values.

Aspect 18: The method of aspect 17, wherein the one or more bit field values indicate a TRS ID corresponding to the set of parameters associated with the primary serving cell.

Aspect 19: The method of any of aspects 17 through 18, further comprising: transmitting, via the second signaling, a first bit field value of the set of bit field values that comprises the indication that specifies that the second serving cell is to be activated as the primary serving cell, wherein deactivating the first serving cell is based at least in part on transmitting the first bit field value.

Aspect 20: The method of aspect 19, further comprising: transmitting, via the second signaling based at least in part on the second serving cell being activated as the primary serving cell, a second set of bit field values indicating a second set of parameters associated with the primary serving cell.

Aspect 21: The method of aspect 20, wherein the set of bit field values indicate a TRS ID corresponding to the set of parameters associated with the primary serving cell, and the second set of bit field values indicate a special cell configuration corresponding to the second set of parameters associated with the primary serving cell.

Aspect 22: The method of any of aspects 20 through 21, wherein the set of bit field values comprises a first octet of bit field values, and the second set of bit field values comprises a second set of bit field values.

Aspect 23: The method of any of aspects 20 through 22, wherein a first subset of bit field values of the second set of bit field values indicate the second set of parameters associated with the primary serving cell, and a second subset of bit field values of the second set of bit field values indicate beam information associated with the primary serving cell.

Aspect 24: The method of any of aspects 17 through 23, further comprising: transmitting, via the second signaling based at least in part on the second serving cell being activated as the primary serving cell, a second set of bit field values comprising at least a first bit field value comprising the indication that specifies that the second serving cell is to be activated as the primary serving cell, and at least a second bit field value indicating a second set of parameters associated with the primary serving cell.

Aspect 25: The method of any of aspects 17 through 24, further comprising: transmitting, via the second signaling based at least in part on the second serving cell being activated as the primary serving cell, a second set of bit field values comprising the indication that specifies that the second serving cell is to be activated as the primary serving cell; and transmitting, via the second signaling based at least in part on the second serving cell being activated as the primary serving cell, a third set of bit field values indicating a second set of parameters associated with the primary serving cell.

Aspect 26: The method of any of aspects 16 through 25, further comprising: transmitting, via the second signaling, an activation of a third serving cell at the UE; transmitting, via the second signaling, an indication that specifies that the third serving cell is to be activated as a secondary serving cell.

Aspect 27: The method of any of aspects 16 through 26, wherein the first serving cell comprises an additional primary serving cell, the method further comprising: transmitting, via the second signaling, a deactivation of the additional primary serving cell, wherein deactivating the first serving cell is based at least in part on transmitting the second signaling.

Aspect 28: The method of any of aspects 16 through 27, further comprising: transmitting, via the second signaling, a bit field value that indicates the second signaling comprises a message format that is associated with an activation, a deactivation, or both, of both primary serving cells and secondary serving cells, wherein transmitting the indication that specifies that the second serving cell is to be activated as a primary serving cell is based at least in part on the second signaling comprising the message format.

Aspect 29: The method of any of aspects 16 through 28, wherein the second signaling is associated with a LCID indicating a message format that is associated with an activation, a deactivation, or both, of both primary serving cells and secondary serving cells.

Aspect 30: The method of any of aspects 16 through 29, wherein the L3 control signaling comprises RRC signaling, and the L2 control signaling comprises MAC-CE signaling.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a network entity, comprising a processor; memory coupled with the processor; and instructions stored in the memory and executable by the processor to cause the apparatus to perform a method of any of aspects 16 through 30.

Aspect 35: An apparatus for wireless communication at a network entity, comprising at least one means for performing a method of any of aspects 16 through 30.

Aspect 36: A non-transitory computer-readable medium storing code for wireless communication at a network entity, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
one or more memories coupled with the one or more processors; and
instructions stored in the one or more memories and executable by the one or more processors to cause the apparatus to:
receive, from a first serving cell and via Layer 3 control signaling, first signaling indicative of a plurality of sets of parameters for primary serving cell and secondary serving cell operation;
receive, from the first serving cell and via Layer 2 control signaling, second signaling indicating an activation of a second serving cell at the UE, the second signaling comprising a bit field that indicates a message format of the second signaling, wherein a first value of the bit field indicates a first message format used to activate and deactivate both primary serving cells and secondary serving cells, and wherein a second value of the bit field indicates a second message format used to activate and deactivate only secondary serving cells;
receive, via the second signaling, an indication that specifies that the second serving cell is to be activated as a primary serving cell based at least in part on the second signaling comprising the first value of the bit field that indicates the first message format; and
communicate with the second serving cell as the primary serving cell based at least in part on receiving the second signaling and in accordance with a set of parameters from the plurality of sets of parameters indicated by the first signaling.

2. The apparatus of claim 1, wherein the instructions are further executable by the one or more processors to cause the apparatus to:
receive, via the second signaling, a set of bit field values associated with the activation of the second serving cell, the set of bit field values different from the bit field that indicates the message format of the second signaling, wherein one or more bit field values of the set of bit field values indicate the set of parameters associated with the primary serving cell, wherein communicating with the second serving cell as the primary serving cell is based at least in part on receiving the one or more bit field values.

3. The apparatus of claim 2, wherein the one or more bit field values indicate a tracking reference signal identifier corresponding to the set of parameters associated with the primary serving cell.

4. The apparatus of claim 2, wherein the instructions are further executable by the one or more processors to cause the apparatus to:
receive, via the second signaling, a first bit field value of the set of bit field values that comprises the indication that specifies that the second serving cell is to be activated as the primary serving cell, wherein communicating with the second serving cell as the primary serving cell is based at least in part on receiving the first bit field value.

5. The apparatus of claim 4, wherein the instructions are further executable by the one or more processors to cause the apparatus to:
receive, via the second signaling based at least in part on the second serving cell being activated as the primary serving cell, a second set of bit field values indicating a second set of parameters associated with the primary serving cell, the second set of bit field values different from the set of bit field values and the bit field that indicates the message format of the second signaling, wherein communicating with the second serving cell as the primary serving cell is based at least in part on the second set of parameters.

6. The apparatus of claim 5, wherein the set of bit field values indicate a tracking reference signal identifier corresponding to the set of parameters associated with the primary serving cell, and wherein the second set of bit field values indicate a special cell configuration corresponding to the second set of parameters associated with the primary serving cell.

7. The apparatus of claim 5, wherein the set of bit field values comprises a first octet of bit field values, and wherein the second set of bit field values comprises a second octet of bit field values.

8. The apparatus of claim 5, wherein a first subset of bit field values of the second set of bit field values indicate the second set of parameters associated with the primary serving cell, and wherein a second subset of bit field values of the second set of bit field values indicate beam information associated with the primary serving cell, wherein communicating with the second serving cell as the primary serving cell is based at least in part on the beam information.

9. The apparatus of claim 2, wherein the instructions are further executable by the one or more processors to cause the apparatus to:
receive, via the second signaling based at least in part on the second serving cell being activated as the primary serving cell, a second set of bit field values comprising at least a first bit field value indicating a cell index associated with the second serving cell that specifies that the second serving cell is to be activated as the primary serving cell, and at least a second bit field value indicating a second set of parameters associated with the primary serving cell, wherein communicating with the second serving cell as the primary serving cell is based at least in part on receiving the second set of bit field values.

10. The apparatus of claim 2, wherein the instructions are further executable by the one or more processors to cause the apparatus to:
receive, via the second signaling based at least in part on the second serving cell being activated as the primary serving cell, a second set of bit field values indicating a cell index associated with the second serving cell that specifies that the second serving cell is to be activated as the primary serving cell; and
receive, via the second signaling based at least in part on the second serving cell being activated as the primary serving cell, a third set of bit field values indicating a second set of parameters associated with the primary serving cell, wherein communicating with the second serving cell as the primary serving cell is based at least in part on receiving the second set of bit field values and the third set of bit field values.

11. The apparatus of claim 1, wherein the instructions are further executable by the one or more processors to cause the apparatus to:

receive, via the second signaling, an activation of a third serving cell at the UE;
receive, via the second signaling, an indication that specifies that the third serving cell is to be activated as a secondary serving cell; and
communicate with the third serving cell as the secondary serving cell based at least in part on receiving the second signaling and in accordance with a second set of parameters from the plurality of sets of parameters indicated by the first signaling.

12. The apparatus of claim 1, wherein the first serving cell comprises an additional primary serving cell, and the instructions are further executable by the one or more processors to cause the apparatus to:
receive, via the second signaling, a deactivation of the additional primary serving cell; and
deactivate the additional primary serving cell based at least in part on receiving the second signaling, wherein communicating with the second serving cell as the primary serving cell is based at least in part on deactivating the additional primary serving cell.

13. The apparatus of claim 1, wherein the second signaling comprises a bitmap comprising a plurality of bits corresponding to a plurality of candidate cells for activation as primary serving cells, secondary serving cells, or both, the second serving cell included within the plurality of candidate cells, wherein the second signaling comprises:
a second bit field included within the bitmap that indicates the second serving cell is to be activated as either a primary serving cell or a secondary serving cell; and
a third bit field corresponding to the second bit field, wherein a first value of the third bit field indicates that the second serving cell is to be activated as the primary serving cell, and wherein a second value of the third bit field indicates that the second serving cell is to be activated as a secondary serving cell.

14. The apparatus of claim 1, wherein the second signaling is associated with a logical channel identifier indicating the first message format that is used to activate and deactivate both primary serving cells and secondary serving cells.

15. The apparatus of claim 1, wherein the Layer 3 control signaling comprises radio resource control signaling, and wherein the Layer 2 control signaling comprises medium access control-control element signaling.

16. An apparatus for wireless communication at a network entity, comprising:
one or more processors;
one or more memories coupled with the one or more processors; and
instructions stored in the one or more memories and executable by the one or more processors to cause the apparatus to:
transmit, to a user equipment (UE) using a first serving cell supported by the network entity and via Layer 3 control signaling, first signaling indicative of a plurality of sets of parameters for primary serving cell and secondary serving cell operation;
transmit, to the UE using the first serving cell and via Layer 2 control signaling, second signaling indicating an activation of a second serving cell at the UE, the second signaling comprising a bit field that indicates a message format of the second signaling, wherein a first value of the bit field indicates a first message format used to activate and deactivate both primary serving cells and secondary serving cells, and wherein a second value of the bit field indicates a second message format used to activate and deactivate only secondary serving cells;
transmit, via the second signaling, an indication that specifies that the second serving cell is to be activated as a primary serving cell based at least in part on the second signaling comprising the first value of the bit field that indicates the first message format; and
deactivate the first serving cell at the UE based at least in part on the second serving cell to be activated at the UE as the primary serving cell.

17. The apparatus of claim 16, wherein the instructions are further executable by the one or more processors to cause the apparatus to:
transmit, via the second signaling, a set of bit field values associated with the activation of the second serving cell, the set of bit field values different from the bit field that indicates the message format of the second signaling, wherein one or more bit field values of the set of bit field values indicate a set of parameters associated with the primary serving cell, wherein deactivating the first serving cell is based at least in part on transmitting the one or more bit field values.

18. The apparatus of claim 17, wherein the one or more bit field values indicate a tracking reference signal identifier corresponding to the set of parameters associated with the primary serving cell.

19. The apparatus of claim 17, wherein the instructions are further executable by the one or more processors to cause the apparatus to:
transmit, via the second signaling, a first bit field value of the set of bit field values that comprises the indication that specifies that the second serving cell is to be activated as the primary serving cell, wherein deactivating the first serving cell is based at least in part on transmitting the first bit field value.

20. The apparatus of claim 19, wherein the instructions are further executable by the one or more processors to cause the apparatus to:
transmit, via the second signaling based at least in part on the second serving cell being activated as the primary serving cell, a second set of bit field values indicating a second set of parameters associated with the primary serving cell, the second set of bit field values different from the set of bit field values and the bit field that indicates the message format of the second signaling.

21. The apparatus of claim 20, wherein the set of bit field values indicate a tracking reference signal identifier corresponding to the set of parameters associated with the primary serving cell, and wherein the second set of bit field values indicate a special cell configuration corresponding to the second set of parameters associated with the primary serving cell.

22. The apparatus of claim 20, wherein the set of bit field values comprises a first octet of bit field values, and wherein the second set of bit field values comprises a second octet of bit field values.

23. The apparatus of claim 20, wherein a first subset of bit field values of the second set of bit field values indicate the second set of parameters associated with the primary serving cell, and wherein a second subset of bit field values of the second set of bit field values indicate beam information associated with the primary serving cell.

24. The apparatus of claim 17, wherein the instructions are further executable by the one or more processors to cause the apparatus to:

transmit, via the second signaling based at least in part on the second serving cell being activated as the primary serving cell, a second set of bit field values comprising at least a first bit field value comprising the indication that specifies that the second serving cell is to be activated as the primary serving cell, and at least a second bit field value indicating a second set of parameters associated with the primary serving cell.

25. The apparatus of claim 17, wherein the instructions are further executable by the one or more processors to cause the apparatus to:
transmit, via the second signaling based at least in part on the second serving cell being activated as the primary serving cell, a second set of bit field values comprising the indication that specifies that the second serving cell is to be activated as the primary serving cell; and
transmit, via the second signaling based at least in part on the second serving cell being activated as the primary serving cell, a third set of bit field values indicating a second set of parameters associated with the primary serving cell.

26. The apparatus of claim 16, wherein the instructions are further executable by the one or more processors to cause the apparatus to:
transmit, via the second signaling, an activation of a third serving cell at the UE; and
transmit, via the second signaling, an indication that specifies that the third serving cell is to be activated as a secondary serving cell.

27. The apparatus of claim 16, wherein the first serving cell comprises an additional primary serving cell, and the instructions are further executable by the one or more processors to cause the apparatus to:
transmit, via the second signaling, a deactivation of the additional primary serving cell, wherein deactivating the first serving cell is based at least in part on transmitting the second signaling.

28. The apparatus of claim 16, wherein the second signaling comprises a bitmap comprising a plurality of bits corresponding to a plurality of candidate cells for activation as primary serving cells, secondary serving cells, or both, the second serving cell included within the plurality of candidate cells, wherein the second signaling comprises:
a second bit field included within the bitmap that indicates the second serving cell is to be activated as either a primary serving cell or a secondary serving cell; and
a third bit field corresponding to the second bit field, wherein a first value of the third bit field indicates that the second serving cell is to be activated as the primary serving cell, and wherein a second value of the third bit field indicates that the second serving cell is to be activated as a secondary serving cell.

29. A method for wireless communication at a user equipment (UE), comprising:
receiving, from a first serving cell and via Layer 3 control signaling, first signaling indicative of a plurality of sets of parameters for primary serving cell and secondary serving cell operation;
receiving, from the first serving cell and via Layer 2 control signaling, second signaling indicating an activation of a second serving cell at the UE, the second signaling comprising a bit field that indicates a message format of the second signaling, wherein a first value of the bit field indicates a first message format used to activate and deactivate both primary serving cells and secondary serving cells, and wherein a second value of the bit field indicates a second message format used to activate and deactivate only secondary serving cells;
receiving, via the second signaling, an indication that specifies that the second serving cell is to be activated as a primary serving cell based at least in part on the second signaling comprising the first value of the bit field that indicates the first message format; and
communicating with the second serving cell as the primary serving cell based at least in part on receiving the second signaling and in accordance with a set of parameters from the plurality of sets of parameters indicated by the first signaling.

30. A method for wireless communication at a network entity, comprising:
transmitting, to a user equipment (UE) using a first serving cell supported by the network entity and via Layer 3 control signaling, first signaling indicative of a plurality of sets of parameters for primary serving cell and secondary serving cell operation;
transmitting, to the UE using the first serving cell and via Layer 2 control signaling, second signaling that activates a second serving cell at the UE, the second signaling comprising a bit field that indicates a message format of the second signaling, wherein a first value of the bit field indicates a first message format used to activate and deactivate both primary serving cells and secondary serving cells, and wherein a second value of the bit field indicates a second message format used to activate and deactivate only secondary serving cells;
transmitting, via the second signaling, an indication that specifies that the second serving cell is to be activated as a primary serving cell based at least in part on the second signaling comprising the message format; and
deactivating the first serving cell at the UE based at least in part on the second serving cell to be activated at the UE as the primary serving cell.

* * * * *